(12) United States Patent
Latzina et al.

(10) Patent No.: US 7,987,176 B2
(45) Date of Patent: Jul. 26, 2011

(54) MIXED INITIATIVE SEMANTIC SEARCH

(75) Inventors: Markus Latzina, Wiesenbach (DE); Anoshirwan Soltani, Frankfurt (DE)

(73) Assignee: SAP AG, Waldorf (DE)

( * ) Notice: Subject to any disclaimer, the term of this patent is extended or adjusted under 35 U.S.C. 154(b) by 388 days.

(21) Appl. No.: 11/821,703

(22) Filed: Jun. 25, 2007

(65) Prior Publication Data

US 2008/0319947 A1 Dec. 25, 2008

(51) Int. Cl.
G06F 7/00 (2006.01)
G06F 17/30 (2006.01)

(52) U.S. Cl. ............. 707/713; 707/758; 707/769; 704/9

(58) Field of Classification Search ...... 707/3, 705–788, 707/999.3; 704/9
See application file for complete search history.

(56) References Cited

U.S. PATENT DOCUMENTS

| | | | |
|---|---|---|---|
| 7,526,425 B2* | 4/2009 | Marchisio et al. | 704/9 |
| 2004/0030692 A1* | 2/2004 | Leitermann | 707/4 |
| 2005/0043940 A1* | 2/2005 | Elder | 704/9 |
| 2005/0222977 A1* | 10/2005 | Zhou et al. | 707/3 |
| 2006/0048055 A1* | 3/2006 | Wu et al. | 715/535 |
| 2006/0167931 A1* | 7/2006 | Bobick et al. | 707/102 |
| 2007/0192292 A1* | 8/2007 | Imielinski | 707/3 |

OTHER PUBLICATIONS

Ilyas et al. "A conceptual architecture for semantic search engine", Multitopic Conference, 2004. Proceedings of INMIC 2004. 8th International Dec. 24-26, 2004 pp. 605-610. Downlowad: http://ieeexplore.ieee.org/stamp/stamp.jsp?tp=&arnumber=1492956&isnumber=32103.*
Braga et al., "NGS: a framework for multi-domain query answering", Data Engineering Workshop, 2008. IEEE 24th International Conference p. 254-261. Download: http://ieeexplore.ieee.org/stamp/stamp.jsp?arnumber=4498328&tag=1.*
Rajamani et al. "Query Domains: Grouping Heterogeneous Sensors Based on Proximity", Mobile Adhoc and Sensor Systems. 2007. IEEE Internatonal Conference. 2007. p. 1-6. Download: http://ieeexplore.ieee.org/stamp/stamp.jsp?arnumber=4428732.*
"A9 (description)", At Wikpedia.org; http://en.wikipedia.org/wiki/A9.com, Internet Search Engine from Amazon.com; went live Apr. 4, 2004,(Retrieved Mar. 22, 2007).
"BrainBoost—A Question Answering Search Engine (description)", At About.com, http://websearch.about.com/od/enqinesand-directories/a/brainboost.htm, (Retrieved Mar. 22, 2007), 1 pg.

* cited by examiner

Primary Examiner — Shahid A Alam
Assistant Examiner — Hares Jami
(74) Attorney, Agent, or Firm — Schwegman, Lundberg & Woessner, P.A.

(57) ABSTRACT

In one embodiment, a method is illustrated including receiving a search query, parsing the search query to identify first and second search terms, determining a relationship between the first and second search terms based on their respective domain assignments, conducting a search based on the respective domain assignments, and displaying a result of the search based on the respective domain assignments, and the relationship between the first and second search terms, as at least one rephrasing of the search query.

15 Claims, 30 Drawing Sheets

FIG. 8
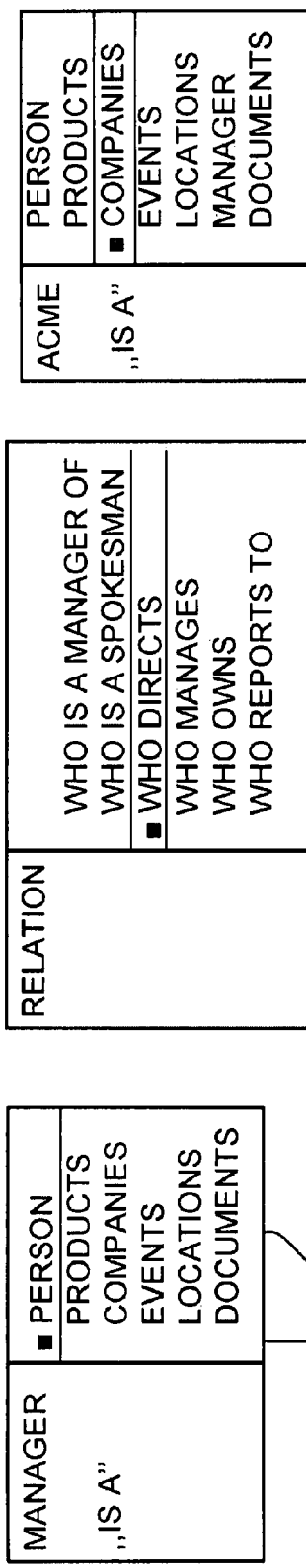
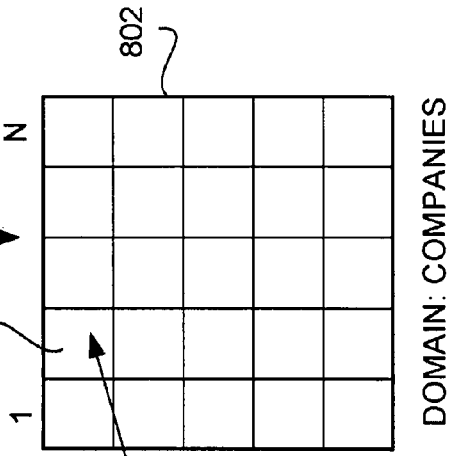
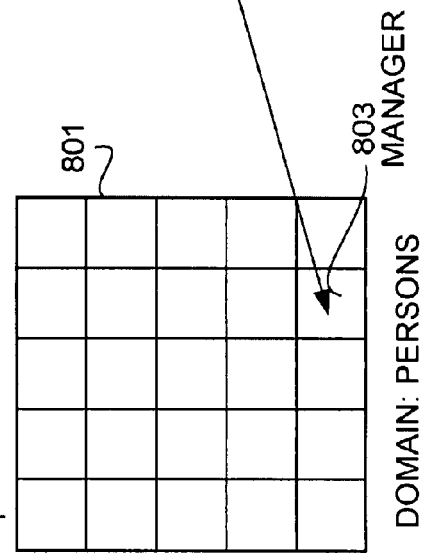

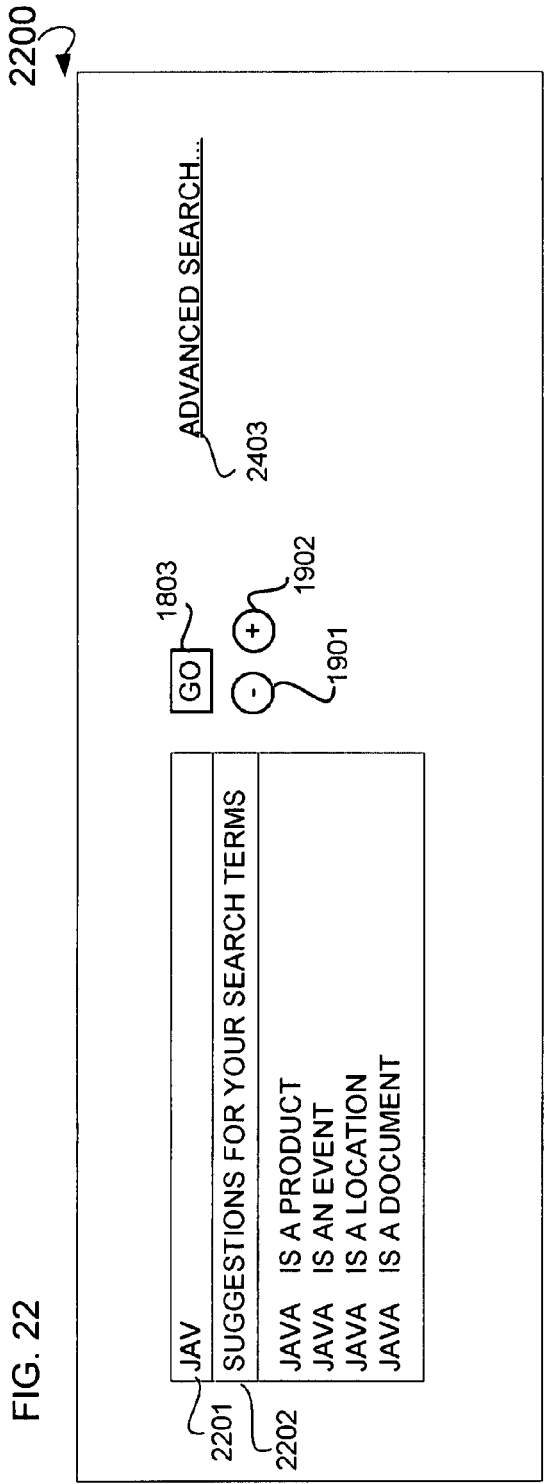
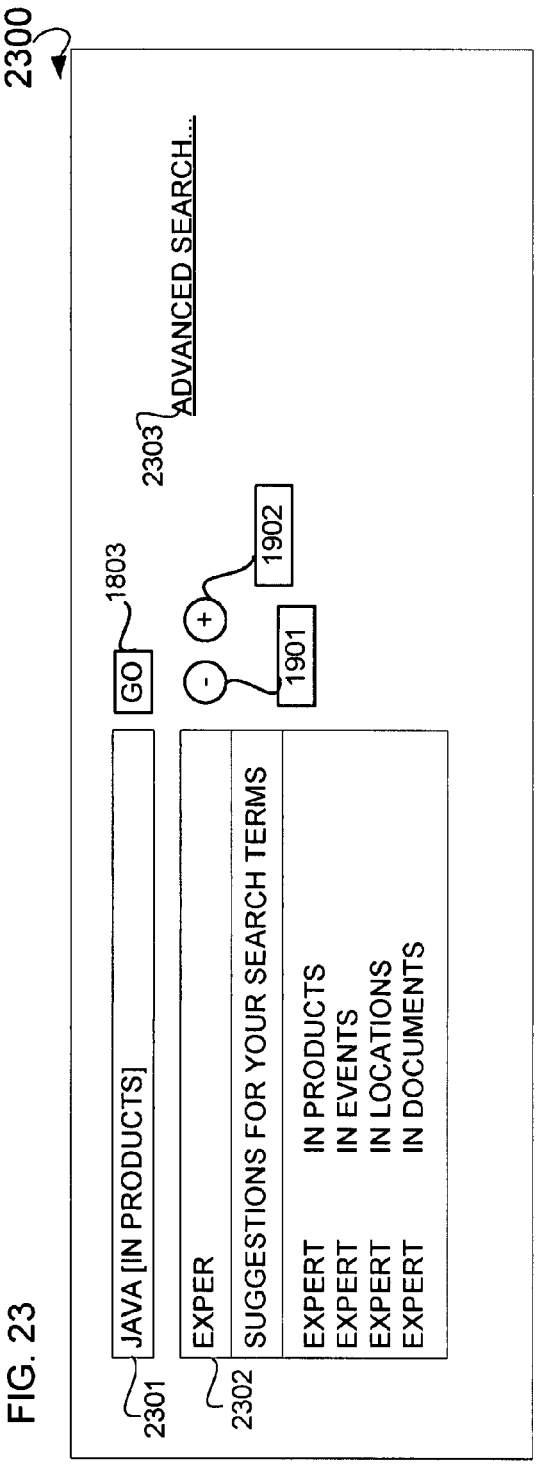

MIXED INITIATIVE SEMANTIC SEARCH

COPYRIGHT

A portion of the disclosure of this document contains material that is subject to copyright protection. The copyright owner has no objection to the facsimile reproduction by anyone of the patent document or the patent disclosure as it appears in the Patent and Trademark Office patent files or records but otherwise reserves all copyright rights whatsoever. The following notice applies to the software, data, and/or screenshots that may be illustrated below and in the drawings that form a part of this document: Copyright© 2007, SAP AG. All Rights Reserved.

TECHNICAL FIELD

The present application relates generally to the technical field of algorithms and programming and, in one specific example, to the optimization of search techniques and user interfaces (UIs).

BACKGROUND

Search techniques are commonly based upon general principles or bases for conducting a search. These principles include often include basing the success of the search upon whether a match, or near match, for the search query is actually discovered and provided as a search result. Such an approach may not take into account the importance of context and relations between search terms when conducting a search.

BRIEF DESCRIPTION OF THE DRAWINGS

Some embodiments are illustrated by way of example and not limitation in the figures of the accompanying drawings in which:

FIG. 8 is a diagram illustrating a matrix representation of a semantic query wherein a mapping occurs across more than one domain (e.g., multi-domain searching, inter-domain searching), according to an example embodiment.

FIG. 22 is a diagram of a UI illustrating possible dynamic behavior manifested by a UI, according to an example embodiment.

FIG. 23 is a diagram of a UI illustrating possible dynamic behavior manifested by a UI where possible search queries are broken down into sub-queries, according to an example embodiment.

DETAILED DESCRIPTION

Figure 1:
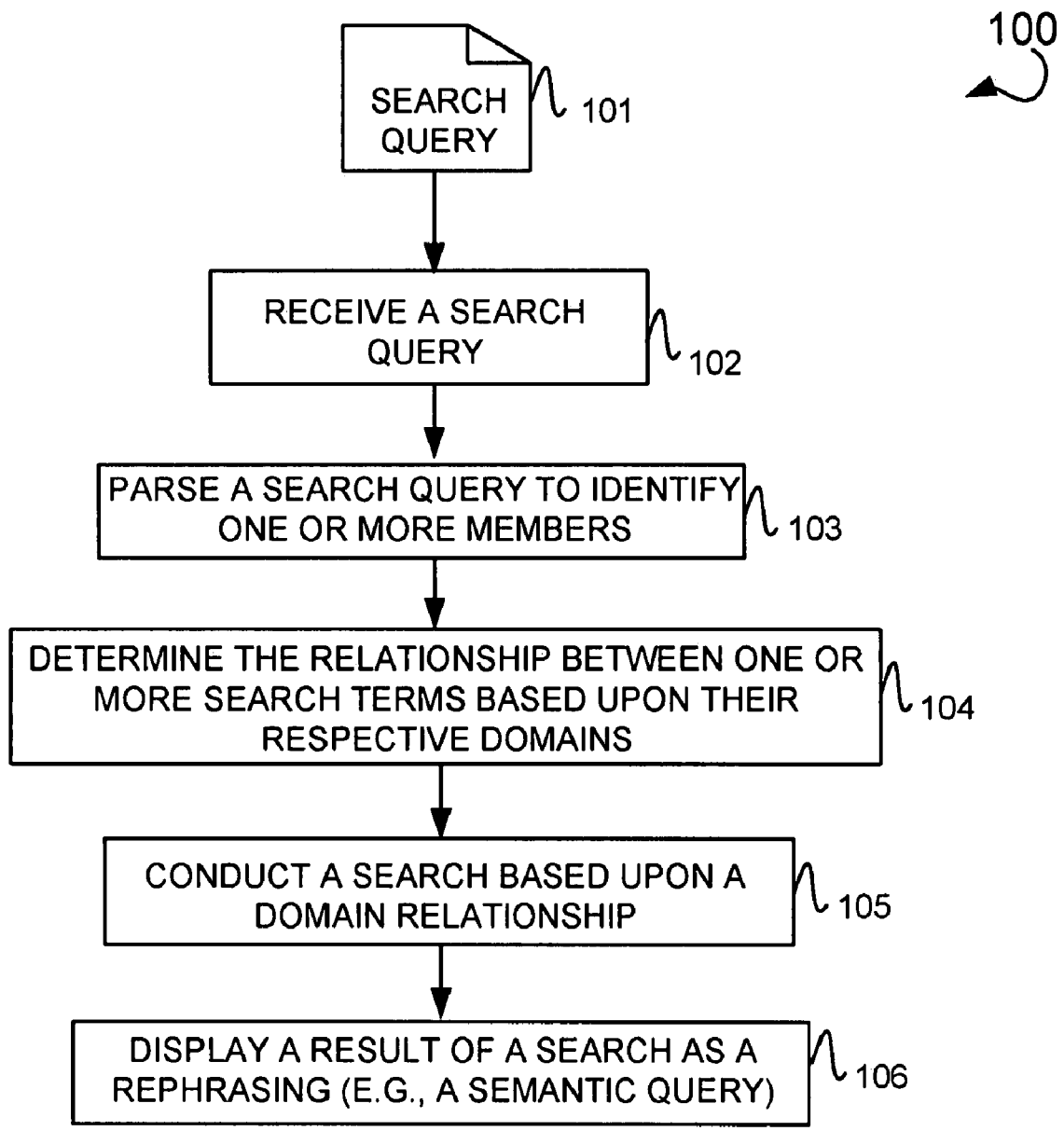
FIG. 1 is a flow chart illustrating an example method used to conduct a semantic search, according to an example embodiment.

In the following description, for purposes of explanation, numerous specific details are set forth to provide a thorough understanding of an embodiment of the present invention. It will be evident to one skilled in the art, however, that the present invention may be practiced without these specific details.

The leading digit(s) of reference numbers appearing in the Figures generally corresponds to the FIG. number in which that component is first introduced, such that the same reference number is used throughout to refer to an identical component that appears in multiple figures. Signals and connections may be referred to by the same reference number or label, and the actual meaning will be clear from its use in the context of the description.

Illustrated is a system and method for leveraging existing database functionality and operations (e.g., joins, inner and outer joins, cartesian product, difference, union, intersection, and other operations known in the art) to generate Natural Language (NL) based search results. These NL search results may be in the form of a rephrase (e.g., a semantic query). This semantic query may be in the form of a record or tuple value, existing as part of one or more database table attributes (e.g., domains), that are related via one or more relational phrases. The ability to perform various database operations on these tuple values also provides the basis for relating these tuple values through relational phrases (e.g., semantic relations). The generation of search queries and the retrieval of search results (e.g., semantic queries) based upon these search queries may be considered mixed (e.g., a mixed initiative) in that search queries may be made of one or more default domains, and/or may made of user-specified domains. In certain cases, the role of a user (e.g., a user as a manager, employee, or sales person) within an organization dictates the domains that may be searched and the relationships that may be established between the retrieved tuple values. In certain cases, an administrator may set certain privileges for a user to establish their role and the default queries (e.g., default semantic queries) they are entitled to see. These privileges may also determine the search terms, operators, or other tools for searching that a user may be able to use.

The illustrated system and method may reside as part of an enterprise search application such as SAP ENTERPRISE SEARCH™, or some other suitable enterprise search application. Further, this system and method may be divided into two parts: a training phrase (see e.g., FIG. 4), and a search phase (see e.g., FIG. 14-17). First, users may be allowed to generate training data, and search results may be based upon this training data. In some embodiments, this training phrase may occur contemporaneously with the search phase, such that a user may populate a domain with search terms and then perform a search using these search terms. These search terms may be specific to some type of enterprise or business context. Moreover, during the search phase, existing databases can be used which have not been created solely in the training phase, but are commonly available (e.g., enterprise databases).

Example Domains and Sub-Domains

In some embodiments, a domain is a synonym for category or concept, and likewise sub-domains are sub-categories, or sub-concepts. That is, for example, a term that can be assigned to a domain may also be assigned to a sub-domain, and during the parsing of a search query the query may be assigned or even parsed as part of a domain or sub-domain. Further, in some embodiments, a domain may be a category which, in turn, may be thought of as a set of entities that belong to the same type. For example, a user may enter any of the following search statements including 'term1 term2' (e.g., focusing here only on assignment of term1) such that a query 1 of "Mercedes with ID 4711-999 Barcelona" results in the following parsing and domain assignment: on domain level (e.g., 'Mercedes with ID 4711-999' ISA vehicle; Barcelona ISA city) or, optionally on the sub-domain level (e.g., "Mercedes with ID 4711-999' ISA car; Barcelona ISA city"). Further, a query 2 of "car Barcelona" results in the following parsing and domain assignment: on domain level (e.g., "car ISA vehicle; Barcelona ISA city"), or optionally on sub-domain level (e.g., "car ISA car*; Barcelona ISA city"). Still further, an example query 3: "vehicle Barcelona" results in the following parsing and assignment-on domain level (e.g., "vehicle ISA vehicle*; Barcelona ISA city").

Example Relations

In some embodiments, while hierarchical relations between domains are pervasive in ontologies/semantic webs, usually relations are considered to be "unidimensional". Here, however, multi-dimensional relations may be implemented such that individual terms (e.g., as entered by users as part of a search query) can each be assigned to concepts of varying hierarchical levels (e.g., can be assigned to concepts or sub-concepts, and as a consequence, different types of relations with respect to their hierarchical relationship to each other may be considered). For example, based upon the following assignment: term1 ISA airplane; term2 ISA city, the following relations can be asserted: flies to, lands at airport of. And again, based upon the following assignments: term1 ISA vehicle; term2 ISA city, the following relations can be asserted: moves to; arrives at destination. In some embodiments, "moves to" can be considered to be a superordinate relation as compared to, for example, "flies to" etc.

Some embodiments may include stating that these or other kinds of semantic relations between/among relations can be expressed by means of rules or other notations which may resemble the notations which are being used to express hierarchical relationships a between domains and sub-domains, etc. Further, as stated above, the hierarchical level of which relations (e.g., hierarchical relations between semantic relations or groups of semantic relations) can be assumed to hold between two terms may depend on the hierarchical level of the domains/concepts/categories to which the particular terms have been assigned. Moreover, it should be added that as much as terms can be assigned to domains by default semantic processing and/or by user initiative, or by a combination of both, the same holds true for the selection of relations between assigned terms. While, for example, the system may propose a default or most probable relation between assigned terms, users could override this relation by selecting a different one, for example, from a set of relations proposed by the system on the basis of assigned terms. Additionally, for the sake of completeness, users may reassign any term to a different domain, initiating a dynamic updating of the set of available relations to select from. For example, when assigning a term to a more subordinate domain level, e.g., to a sub-domain, the resulting set of applicable relations between newly assigned terms may entail more concrete, subordinate relations (e.g., as compared to the initial set of relations to select from).

Example Searches

With regard to the actual searches that are conducted, users may be able to conduct searches and retrieve search results not based upon text containing the literal text string, e.g., "manager Sue," but rather users may be able to retrieve search results relating to "manager who reports to Sue", "Sue reports to manager", or some other set of search results based upon training data or based upon data pre-existing in an enterprise database. And again, in certain cases, the name of a manager may be supplied as a search result in response to the search queries "manager who is supervising Sue" or "manager who reports to Sue".

In the above examples, "Sue" and "Manager" may be tuples in one or more databases, and "who reports to" and "reports to" may be semantic relations supplied to link these tuples. For example, various semantic queries may be generated using the search phrase "manager Sue," where "manager" (e.g., a term #1) and "Sue" (e.g., a term #2) are parsed out of the search phrase and the relation between these two words is determined. In cases where the terms have been assigned to a domain such as "persons," it can be assumed that "Manager is a person" and "Sue is a person." Based upon this assumption, certain relations may be inferred and semantic queries generated. Specifically, possible relations may be inferred such that term #1 relates to term #2 (term1$_{person}$ RELATION term2$_{person}$), where the relation may be any one of a number of predefined relations (e.g., RELATION$_{person\text{-}person}$:={direct|report to|buy from|sell to| ... } etc.). These terms may be provided as training data (see e.g., training data packet 408 below). Example semantic queries resulting from the rephrasing of relations may include:

"Which manager reports to Sue?"
"Who is the manager of Sue?"
"Which manager buys from Sue?"
"From which manager does Sue buy?"
"To which manager does Sue sell?"
"Which manager sells to Sue?"

As previously illustrated, this rephrasing of a search phrase may occur such that terms in the same or different domains may be used to generate a semantic query.

In some embodiments, certain database principles and operations are leveraged to facilitate the generation of semantic queries. In cases where a search is conducted, for example, the search query "manager Sue" may be parsed and converted to a default search query in the form of "(manager ISA person) AND (Sue ISA person)", wherein the semantic query "Who is the manager who directs Sue?" is generated that results in "Phil" as a search result based upon a join operation being performed. More to the point, tables containing "Sue" and/or the unique key value by which "Sue" is identified may be joined. In one embodiment, once joined, a list of semantic relations may be employed to join members of a sub-domain wherein a relationship can be inferred (see e.g., R(Employee; Manager)={reports to/is trained by/is hired by/ ... }). In some embodiments, once the semantic query is generated and selected by a user, the search result (e.g., "Phil") may be provided as a result of the execution of the join operation. This result is reflected in the below tables, where OrgUnit serves to uniquely identify each member of the set of persons.

| Persons | Domain Key | OrgUnit | Value |
|---|---|---|---|
| Sue | 1 | B | Employee |
| John | 1 | C | Manager |
| Mary | 1 | A | Manager |

| Persons | Domain Key | Value | OrgUnit |
|---|---|---|---|
| Phil | 1 | manager | B |
| Peter | 1 | employee | C |
| Larry | 1 | employee | A |

| domain | Domain Key |
|---|---|
| person | 1 |

Some embodiments may include inter-domain relations being represented. For example, "Sue" may be an owner of one company directing various managers such as "John" and "Mary." These managers may be working for different companies. The fact that "Sue," "John," and "Mary" all work for different companies implies that they exist as part of the same or different domains. In one example, a search is conducted across domains wherein the search query is "owner Acme". This search query may be transformed into a default search query (e.g., (owner ISA person) AND (Acme ISA company)) that generates the semantic query such as "owner [a person]—who sells—Acme [company]"; "owner [a person]—who buys—Acme [company]". As with the above example, a join operation is used to facilitate this answer "Sue", where the join occurs on a company code value in combination with the domain key value. This result is reflect in the below tables.

| Persons | Domain Key | Company Code | Value |
|---|---|---|---|
| Sue | 1 | 123 | owner |
| John | 1 | 234 | manager |
| Mary | 1 | 456 | manager |

| Company | Domain Key | Company Code | OrgUnit |
|---|---|---|---|
| Acme | 2 | 123 | |
| T-LLC | 2 | 234 | |
| B-Inc | 2 | 345 | |

| Domain | Domain Key |
|---|---|
| Person | 1 |
| Company | 2 |

As will be more fully illustrated below, the basis for a semantic relation may be a default relation, a probabilistic relation, or even a relation based upon some AI-based data structure.

In some embodiments, the role of the user dictates the type of semantic query and search result set that are retrieved (e.g., a default semantic query may be retrieved). For example, if the user conducts a search as a manager, then the semantic query and search results illustrating persons who the user "is a manager of" may be returned as a default semantic query. In some embodiments, relations which are related to managing activities may be suggested by the method and system if they are suitable to the domains to which search terms are being assigned. Further, if, for example, the user who is conducting a search is an employee, then the persons to whom the user "reports to" may be returned as a default semantic query. And again, if, for example, the user's role is as a sales representative, then search queries that contain a name may be, by default, interpreted as referring to, for example, "business partner representatives" (e.g., business contacts). If the user's role is an accounting clerk, search queries containing a name may, by default, be interpreted as referring to "money transfer recipients".

In some embodiments, this mixed initiative searching may be facilitated through a matrix search (e.g., a search using a matrix, or array of matrices such as a multi-dimensional array, as a data structure). A matrix search may include allowing a user to input (e.g., using a GUI) one or several search terms that seem critical to users, in order to retrieve information that matches their needs and expectations. Next, a user may be able to view search results to decide whether they match the user's needs and expectations, and whether additional search results or search result details should be displayed. Additionally, a user may be able to assign search terms to domains (domain assignment), thus identifying or narrowing the range of search results that qualify as meeting user's needs and expectations. Moreover, a user may be able to view proposed semantic relations between search terms, by means of rephrases that state the assumed question the user had in mind when entering search terms. The user may be able to identify the desired semantic relation—as expressed by a rephrase in natural language terms, and/or to alter the set of results and only secondarily to further narrow search results that meet user's needs and expectations, as indicated by the stated search terms. Still further, a user may be able to reassign any of the search terms to a different domain, or to replace existing search terms with the ones that were entered previously, or any combination of both in order to redefine the search result specification or to change the very relation which may have been inserted by means of system or user initiative, or a combination thereof.

Some embodiments may include a method based on both assignments of search terms to domains, and of interpretations of semantic relations between search terms that follow from the respective domain assignments. Specifically, based on the particular domain assignments, more specific semantic relations between concepts—as implied by the stated search terms and their domain assignments—can be retrieved. For example, a search term can be interpreted as the token for a particular type (e.g., a class), or, in optional wording, as an exemplar (or particular) that belongs to a concept (or universal). Types (or concepts), are subordinates of domains. Alternatively, domains/concepts/categories could be considered as synonyms and a subordinate/intermediate class of sub-domains/sub-concepts/sub-categories could be considered/introduced.

In some embodiments, even in the case where users do not make explicit assignments of search terms to domains, the relevant domains can be inferred with the help of the intermediate type (e.g., or (sub) concept). For example, by using a matrix search when users enter the search term "Volvo," it can be inferred that "Volvo" is the token of the type "cars," and, as a consequence, that the search term "Volvo" can be assigned to the domain of "vehicles." Further, a matrix search can offer rephrases (e.g., explanations of semantic relations between search terms as they have been assigned to particular domains) that relate the search terms in meaningful ways.

Further, in another example, where an explicit assignment of a search term is used, such as "Mueller" and "manager" to the domain "Persons" (or "People"), respectively, this allows a user to retrieve the semantic relations that typically apply to this domain (e.g., an intra-domain relation). Specifically, "Mueller" (as token for the type "Manager") directs a person of type "Employee" (as assigned to the domain "Persons"). Once the domain assignment is explicit, only data object attributes need to be taken into account. When the intra-domain relation is "between People," only attributes need to be considered that are person-related: For example, for the data object "Contacts" the semantic relation needs to be applied only to the name attributes (e.g., relations between Name attributes, but not between Phone attributes of a contact). In one embodiment, search terms are assigned to domains in terms of "<search term> is a (type of) domain." Other variants of assignments (e.g., semantic relations) can be employed as well, for example "is not a (type of)," or, "is part of," etc.

In some embodiments, the following table provides the results of example searches (e.g., user input):

| No. | Term 1 (User Input) | Category (Term 1) | Term 2 (User Input) | Category (Term 2) | Relation | Description (~User's intent) | Question (~Query Rephrase) |
| --- | --- | --- | --- | --- | --- | --- | --- |
| 1A | Champagne | Product | Acme | Customer | champagne ordered by Acme | The users wants to know which champagne was ordered by customer Acme | Are you looking for champagne that was ordered by customer Acme? |
| 1B | Champagne | Product | Acme | Customer | champagne shipped to Acme | The user wants to know which champagne was shipped to customer Acme | Are you looking for champagne that was shipped to customer Acme? |
| 1C | Champagne | Product | Acme | Customer | quotation on champagne requested by Acme | The user wants to know which quotations on champagne | Are you looking for quotations on champagne that were |

-continued

| No. | Term 1 (User Input) | Category (Term 1) | Term 2 (User Input) | Category (Term 2) | Relation | Description (~User's intent) | Question (~Query Rephrase) |
|---|---|---|---|---|---|---|---|
| | | | | | | were provided to customer Acme | provided to customer Acme? |
| 2A | Champagne | Location | Acme | Customer | champagne is a region where the customer Acme has an subsidiary | The user wants to know if the customer Acme has an subsidiary in the region champagne | Are you looking for the region champagne were the customer Acme has an subsidiary? |
| 2B | Champagne | Location | Acme | Customer | number of employees who work in champagne for Acme | The user wants to know the number of employees who work in champagne for Acme | Are you looking for the number of employees who work in champagne for Acme? |
| 2C | Champagne | Location | Acme | Customer | expected sales of the subsidiary in champagne of the customer Acme | The user wants to know the expected sales of the location champagne of the customer Acme | Are you looking for the expected sales of the location champagne of the customer Acme? |
| 3A | Champagne | Event | Acme | Customer | champagne is an event that the customer Acme sponsors | The user wants to get information about the event champagne that the customer Acme sponsors | Are you looking for the event champagne the customer Acme sponsors? |
| 3B | Champagne | Event | Acme | Customer | sales volume of the event champagne sponsored by customer Acme | The user wants to know the sales volume of the event champagne sponsored by the customer Acme | Are you looking for the sales volume of the event champagne sponsored by the customer Acme? |
| 4A | A569090008 | Product Number | Acme | Customer | A569090008 is a product number for a product that the customer Acme has ordered | The user wants to get information about the product with the number A569090008 that the customer Acme has ordered | Are you looking for information about the product with the number A569090008 that the customer Acme has ordered? |
| 4B | A569090008 | Order Number | Acme | Customer | A569090008 is an order number for an order of the customer Acme | The user wants to get information about the order with the number A569090008 of the customer Acme | Are you looking for information about the order with the number A569090008 of the customer Acme? |
| 4C | A569090008 | Delivery Number | Acme | Customer | A569090008 is a delivery number for a an order of the customer Acme | The user wants to get information about the order with the number | Are you looking for information about the order with the number |

-continued

| No. | Term 1 (User Input) | Category (Term 1) | Term 2 (User Input) | Category (Term 2) | Relation | Description (~User's intent) | Question (~Query Rephrase) |
|---|---|---|---|---|---|---|---|
| | | | | | | A569090008 of the customer Acme | A569090008 of the customer Acme? |

Example Method to Conduct a Search

FIG. 1 is a flow chart illustrating an example method 100 used to conduct a semantic search. Illustrated is an operation 102 that, when executed, receives a search query 101. Next, an operation 103 is executed that parses the search query to identify one or more search terms. Further, an operation 104 is executed to determine at least one relationship between the one or more search terms based on their respective domain assignment. In some embodiments, prior to the execution of operation 104, the search terms are provided and stored into one or more domains. Then, an operation 105 is executed to conduct a search based on a domain relationship. An operation 106 is also executed to display a search result (e.g., a rephrasing, a hit, a semantic query, a result set) related to the domain relationship as at least one rephrasing of the search query. In addition to these various operations, other operations are also performed. For example, in some cases, an operation is executed to assign one of the relationships between the one or more search terms to a data store as an inter-domain relationship. Additionally, in some cases, an operation is executed to assign one of the relationships between the one or more search terms to a data store as an intra-domain relationship. Moreover, in some cases, an operation is executed to assign the one or more search terms to a domain. The relationship between the one or more search terms based on their respective domain assignment may be at least one of a default relationship, a manually assigned relationship, or a probability-based relationship.

Example Use Case in Conducting a Search

Figure 2:
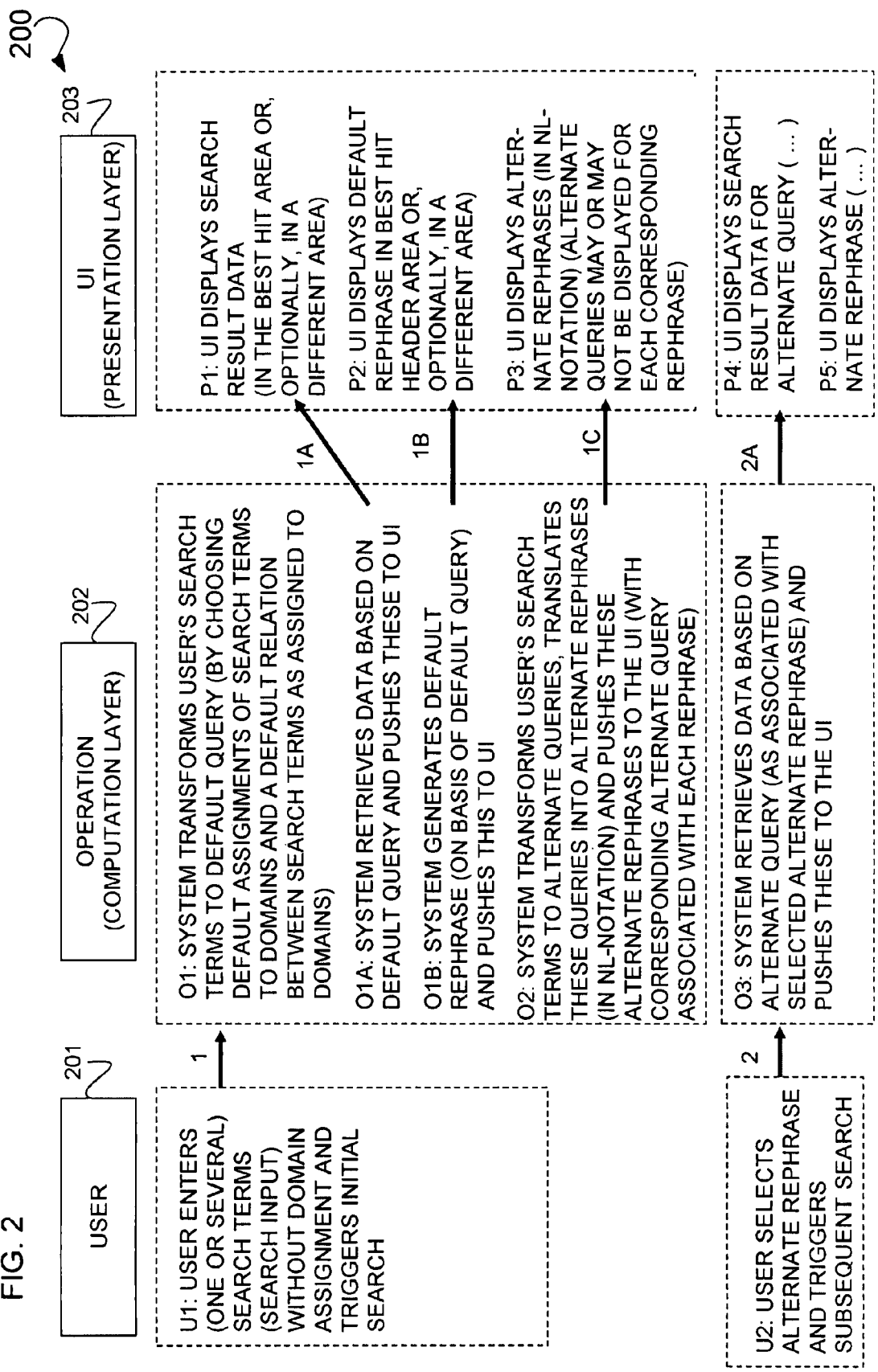
FIG. 2 is a diagram of a use case, illustrating a user, operation (computation layer), and a UI (presentation layer), according to an example embodiment.

FIG. 2 is a diagram of an example use case 200, illustrating a user 201, operation (computation layer) 202, and a UI (presentation layer) 203. In this use case 200, a user (e.g., user layer 201) makes a search query by providing one or more search terms. These search terms are provided without domain assignments. In some cases, based upon the role of the user at user layer 201 (e.g., is the user using user layer 201 a manager, employee etc.), the search terms may be converted into some type of default search query. Based upon this default search query, a UI 203 may display search result data and/or one or more default rephrases (e.g., a semantic query). Then the user at user layer 201 may select one of these rephrases (e.g., semantic queries), and a subsequent search may be triggered. As a result of this subsequent search, further search results (e.g., a search results set) and semantic queries may also be displayed. Additional implementation details are also provided in use case 200.

Figure 3:
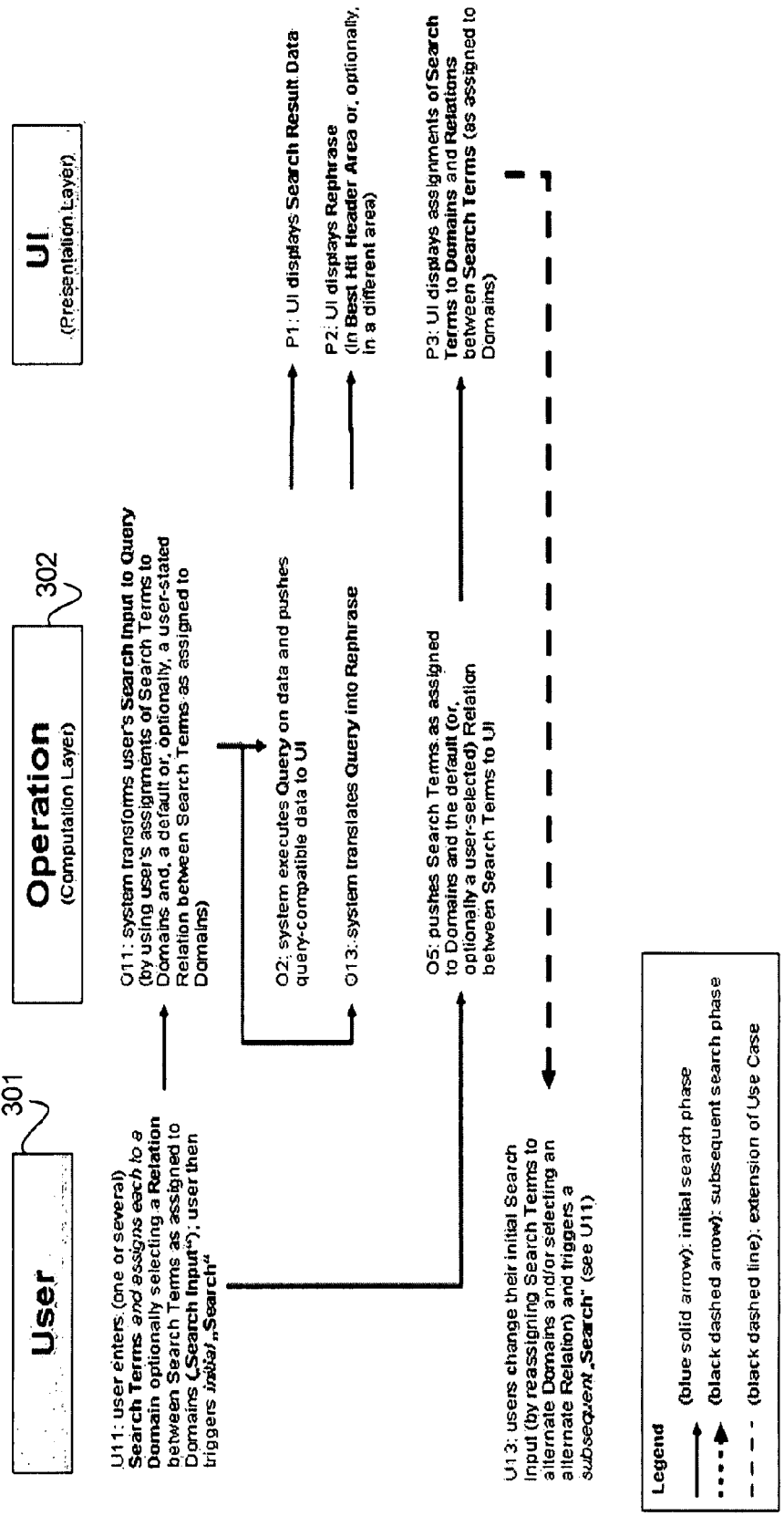
FIG. 3 is a diagram of a use case, illustrating user-initiated assignment of search terms to domains, according to an example embodiment.

FIG. 3 is a diagram of an example use case 300, illustrating user-initiated assignment of search terms to domains. In one embodiment, a user (e.g., an administrator) provides training data or otherwise assigns search terms to a domain (see e.g., user layer 301). In some cases, a relation between search terms is also selected (e.g., a semantic relation). Then a user (e.g., an administrator or lay user) performs a search by providing a search query such that query-compatible data is retrieved and provided as a search result. Further, the query itself may be translated into a rephrase (e.g., a semantic query). Collectively, the query-compatible data and rephrases are generated at the operation (computational layer) 302. Additional functionality is also illustrated in FIG. 3.

An Example System for Searching

Figure 4:
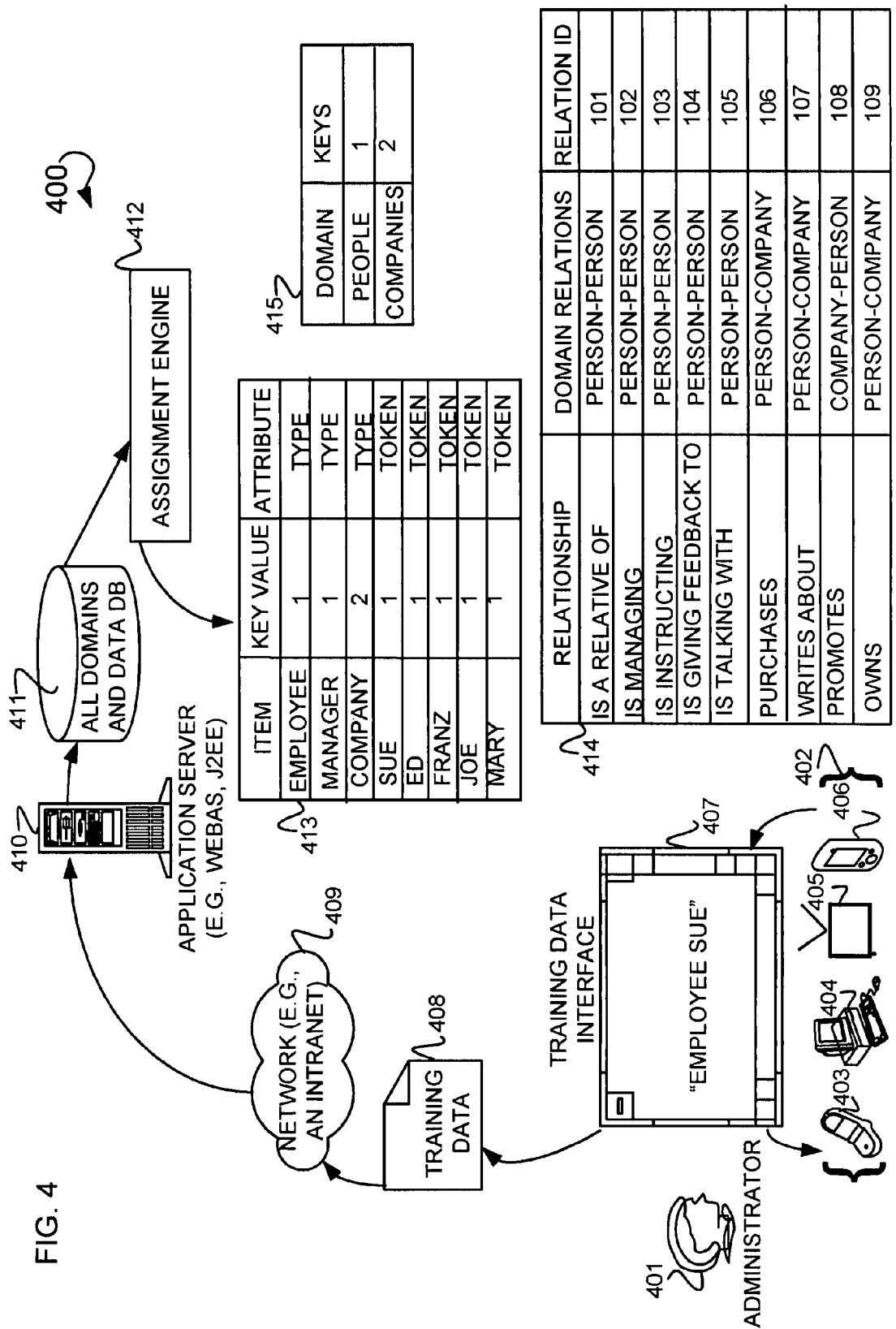
FIG. 4 is a diagram illustrating a system used to make default assignments of training data, according to an example embodiment.

FIG. 4 is a diagram illustrating an example system 400 used to make default assignments of training data. Illustrated is an administrator 401 who, utilizing a device 402 such as a cell phone 403, computer system 404, television 405 and/or Personal Digital Assistant (PDA) 406, and a training data interface 407, submits training data. This training data (e.g., the phrase "employee Sue") may be transported as a training data packet 408 (e.g., an eXtensible Markup Language (XML) formatted data stream, a Resource Description Framework (RDF) formatted data stream, or related notations taken from semantic web/ontologies) across a network 109 to an application server 410. This application server 410 may be, for example, a WEBAS™ application server, a J2EE™ application server, or some other suitable type of application server. This network may be an intranet or an internet. Once received at the application server 410, the training data 408 is parsed and stored into one or more domains (e.g., a collection) residing on an all domains and data database 411. In some embodiments, this collection may contain data tokens and categories of data, such that, for example, the category of sales may have tokens such as salespeople, products, etc. In some cases, the domain may be a default domain, or one specifically selected by the administrator 401. As will be more fully illustrated below, an assignment engine 412 may utilize various table (e.g., 413-415) during the course of determining a domain assignment for a particular piece of training data and associated words, terms, or phrases.

Some embodiments may include a table 413 illustrating members of the domain of persons including, for example, employee, manager, company, and the names of certain people (e.g., Sue, Ed, Franz, Joe, and Mary). Also shown is a key value (e.g., 1 or 2) associated with each of the persons, and an attribute (e.g., type or token). Further, a table 415 is also illustrated containing a list of the various domains including, for example, people and companies with their respective key values (e.g., 1 or 2).

In some embodiments, the various entities listed under the domain of persons (e.g., members of a class) as shown in table 413 may be related through one or more of the relations illustrated in table 414 including, for example, "is a relative of", "is managing", "is instructing", "is giving feedback to", "is talking with", "purchases", "writes about", "promotes" and "owns". Further, illustrated in this table 414 is a domain relation or relations (e.g., person-person, person company, or company-person), and a relations id value. As to the domain relations, the data in this column illustrate what types of domains are being related, whereas the relation id values is a unique identifier value. For example, the rephrase "Sue is a relative of Ed" may be generated in cases where "is a relative of" may be used in relating two members of the domain of person. (e.g., "Sue" and "Ed").

Example embodiments may include taking the training data 408 containing the phrase "employee Sue", applying a default assignment and determining how to categorize the terms in the phrase "employee Sue". For example, assuming that a default assignment is applied in the form of "employee is a person (e.g., people)", then the term "Sue" will be assigned a key value of 1 as a person. Based upon this assignment various relations may be inferred such as:

"Sue is a relative of . . . "
"Sue is managing . . . "
"Sue is instructing . . . "
"Sue is giving feedback . . . "
"Sue is talking with . . . "

These relations may be inferred, in part, due to the fact that Sue is a member of the domain of persons as evidenced by the assignment of a key value of 1.

In some embodiments, the example system 400 is used to make assignments of training data based upon certain percentile values. The assignment engine 412 may use a lookup table containing percentile values to determine the domain with which the training data will be associated. For example, the terms in the phrase "employee Sue" and in particular "Sue" will each be associated with the domain of people, for this domain has a highest probability value (e.g., 33%) associated with it. The probability values may be based upon, for example, the percentage of time the domain is searched, or some other suitable percentage basis.

Example embodiments may include the example system 400 used to insert training data directly into a domain. The assignment engine may be used to generate a manual assignment interface, wherein the training data is associated with a domain. For example, the phrase "employee Sue" may be inserted into a text box whose contents are automatically associated with the employee domain. In some embodiments, as will be more fully discussed below, multiple domains may be represented on a GUI with which training data may be associated.

Example Logic for Training a System

Figure 5:
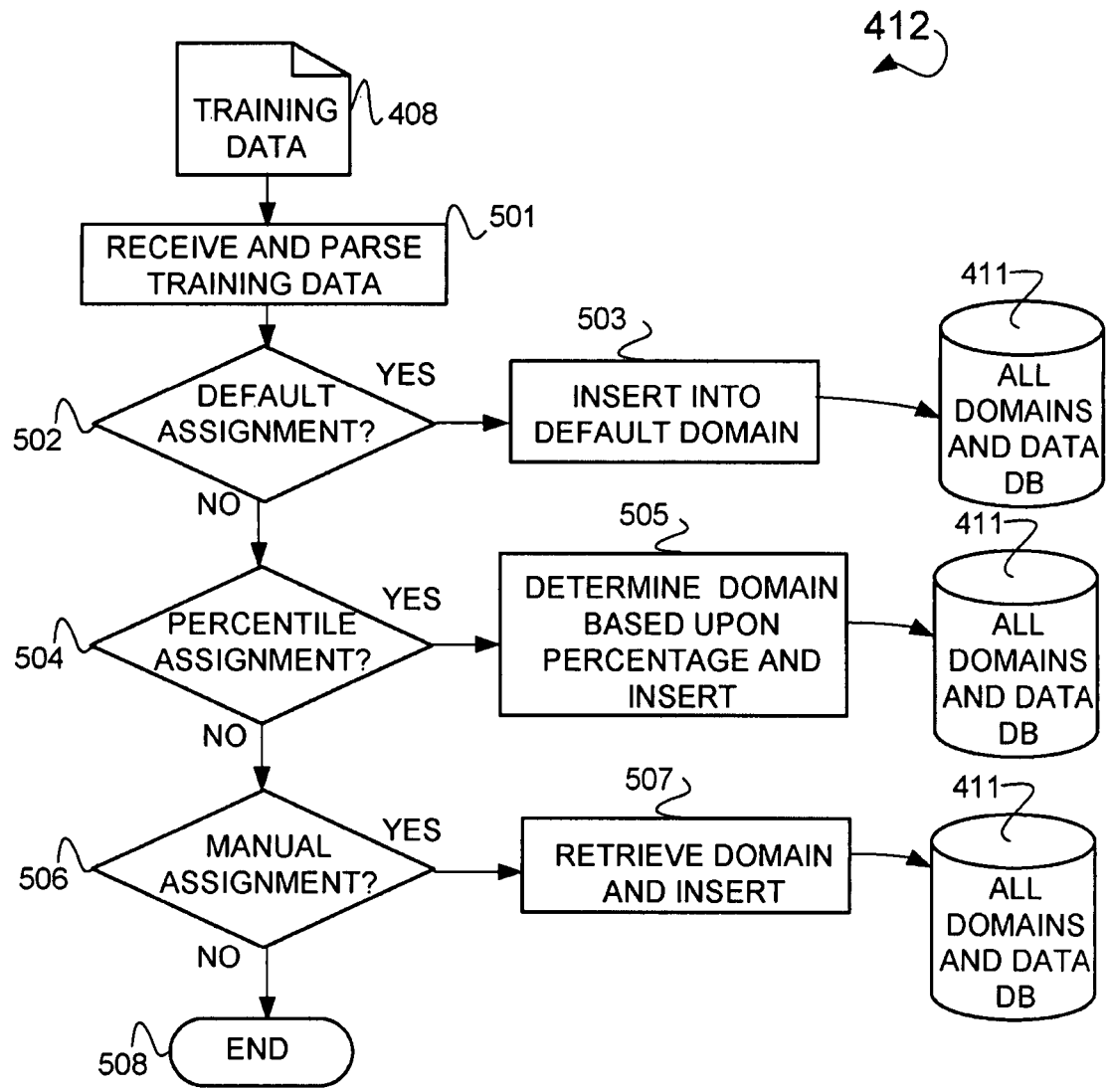
FIG. 5 is a flow chart illustrating a method used to implement an assignment engine, according to an example embodiment.

FIG. 5 is a flow chart illustrating a method used to implement an assignment engine 412. Shown is a training data packet 408 that is parsed via the execution of an operation 501. Once parsed, the training data is passed through a number of decisional operations. These decisional operations may be conditional statements or case statements as are known in the art. Illustrated is a decisional operation 502 that determines whether the parsed training data is to be assigned to a default domain. Where decisional operation evaluates to "yes" (i.e., true) an operation 503 is executed wherein the parsed data is inserted into a default domain residing on the all domains and data database 411. In cases where decisional operation 502 evaluates to the "no" (i.e., false), a decisional operation 504 is executed that determines whether a percentile-based assignment is to be performed. Where decisional operation 504 determines that a percentile based assignment is necessary (e.g., decisional operation 504 evaluates to "yes", true), an operation 505 is executed that determine the domain to which to assign the training data based upon a percentile value. This percentile value may be based upon domains that are most frequently queried by a user, domains most frequently used to store data, a percentile value established by an administrator 401, or some other suitable percentile basis. Where operation 505 is executed, the parsed data is inserted in a domain residing on an all domains and data database 411. In cases where decisional operation 404 evaluates to "no" (e.g., false), a decisional operation 506 is executed that determines whether a manual assignment of the parsed terms is required. Where decisional operation 506 evaluates to "yes" (e.g., true), an operation 507 may be executed wherein a domain is retrieved and term data is inserted into it. This domain may be retrieved from the all domains and data database 411, inserted into and the updated domain returned to this all domains and data database 411. Where decisional operation 506 evaluates to "no" (i.e., false), a termination condition 508 is met.

In some embodiments, the various above-illustrated insert operations (see e.g., operation 503, 505, and 507) are akin to Structured Query Language (SQL) or Multidimensional Expression Language (MDX) based operations such as INSERT and may be performed using these operations. In such an example, a domain may be a database table or other suitable data structure used to store data.

Example Searching Using Matrices

Some embodiments may include an implementation of a matrix search that is able to accommodate searching involving:

A different number of search terms (e.g., exceeding two search terms—see above discussion of complex search queries and non-adjacent nodes);

Additional intra- and inter-domain relations (e.g., relations pertaining to search terms which are assigned to 'Events' or 'Locations');

Different sets of domains to which search terms can be assigned.

As a consequence of these different types of searching, additional sets of semantic relations can be applied both on the level of method (e.g., the computation layer) and on the level of the UI (e.g., the presentation layer), by means of natural language rephrases.

Figure 6:
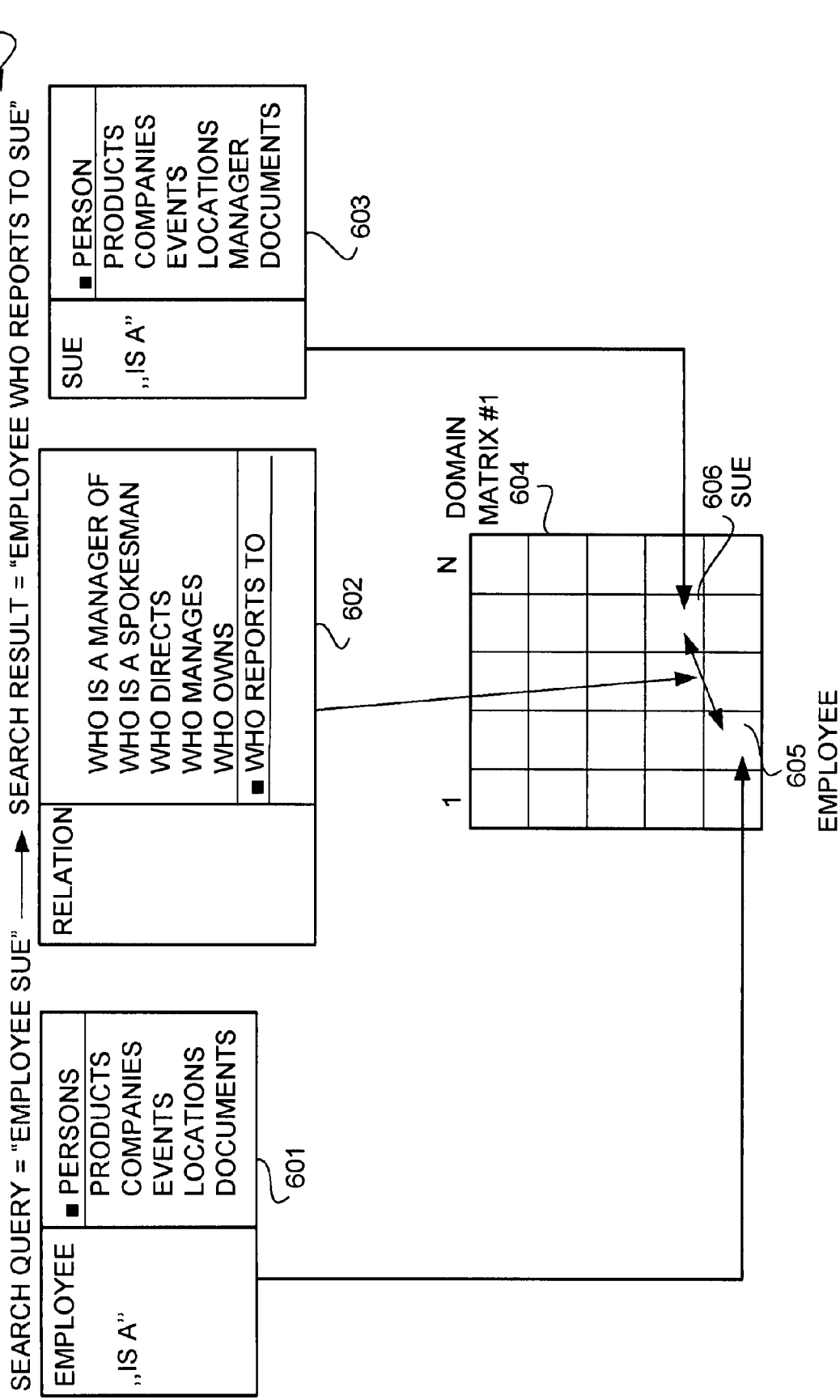
FIG. 6 is a diagram illustrating a matrix representation of a semantic query, according to an example embodiment.

FIG. 6 is a diagram illustrating an example matrix representation 600 of a semantic query. Further, this matrix representation illustrates nodes in terms of semantic relations, and in some cases, classes in terms of individuals or conversely individuals in terms of classes. Illustrated is a domain (see e.g., table 601) that may include members such as, for example, persons, products, companies, events, locations, and/or documents. In some embodiments, each of these members may be a domain in its own right. As illustrated here, a domain of employees is referenced as a person. These employees are related to certain individuals via a semantic relation table 602. This semantic relation may take the form of, for example, an employee "who is a manager of", "who is a spokesman for", "who directs", "who manages", "who owns", "who reports to", and/or "who sells." This semantic relation table 602 may serve to link an employee (see e.g., table 601) who reports to a person (see e.g., table 603) such as "Sue". Some embodiments may include domain matrix #1 604 representing a table (see e.g., tables 1505 and 1605 in FIGS. 15 and 16) resulting from the execution of a database operation. Here, for example, "employee" 605 "reports to" "Sue" 606, where "employee" and "Sue" are members of a domain related through the semantic relation "reports to". In some embodiments, domain matrix #1 604 may be some other type of data structure, such as a multi-dimensional array, a heap, a binary search tree, a link list, a hash table, or some other suitable data structure. Further, in some embodiments, the entries illustrated in tables 601, 602, and 603 may be sorted and ordered on the basis of which entry is the most likely to be used (e.g., some probability-based sorting). This same probability-based sorting may be applied to the tables illustrated in FIGS. 7 and 8 below.

Figure 7:
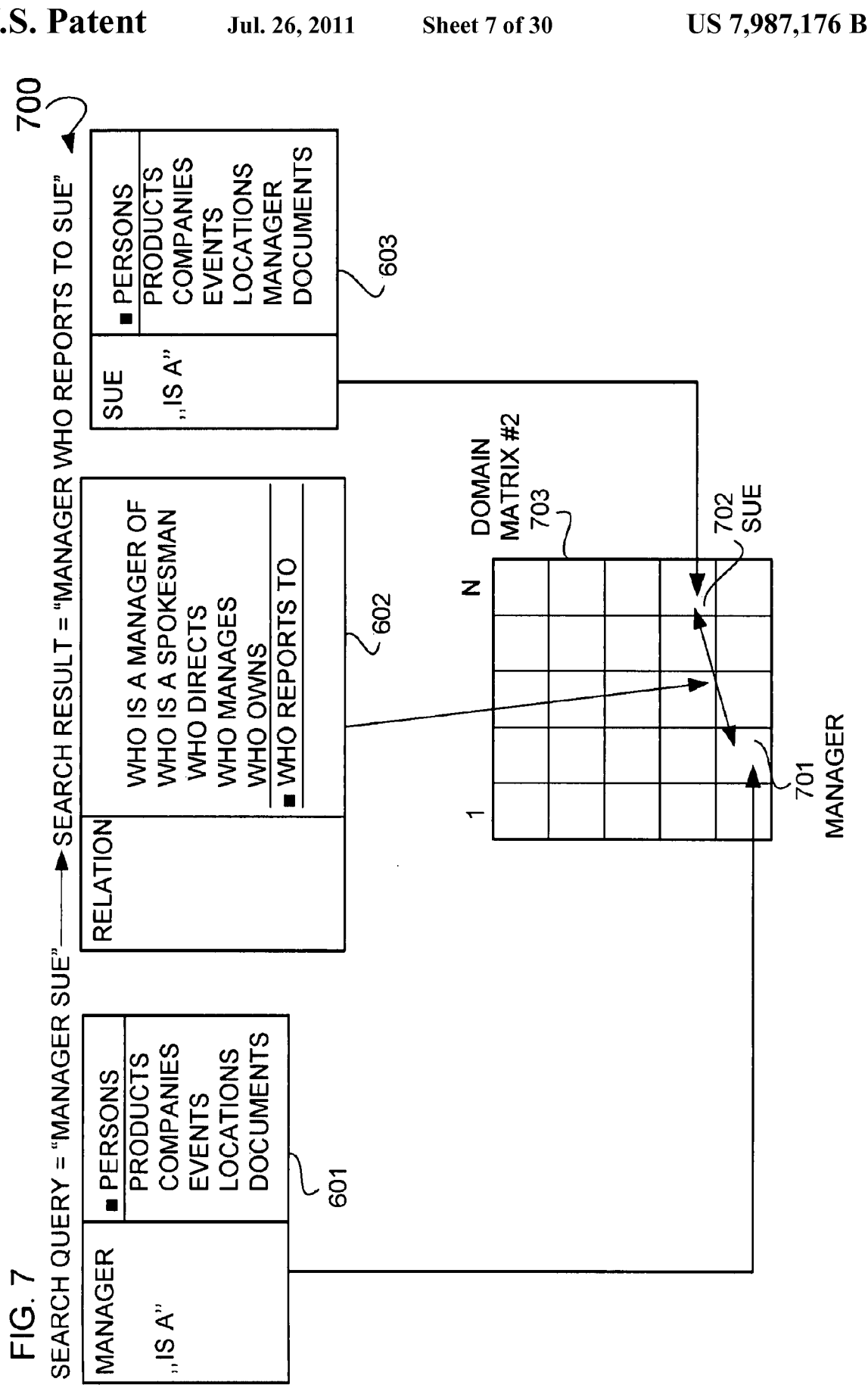
FIG. 7 is a diagram illustrating a matrix representation of a semantic query, according to an example embodiment.

FIG. 7 is a diagram illustrating an example matrix representation 700 of a semantic query. Illustrated is a search query "manager Sue" that results in the "manager who reports to Sue". This search result differs from the result shown in FIG.

6 due to the use of the domain "manager" in lieu of the domain "employee". Shown is a domain matrix #2 703 generated as the result of a database operation. Contained within domain matrix #2 703 are members of the domain including "manager" 701 and "Sue" 702.

FIG. 8 is a diagram illustrating a matrix representation 800 of a semantic query wherein a mapping occurs across more than one domain (e.g., multi-domain searching). Here, for example, is a domain 801 where a manager 803 is a person related via a semantic relation contained in a relations table 602 (e.g., "who directs") to a company (see e.g., table 603), in this case Acme 804. This relation across multiple domains is reflected in relations between members of more than one domain. Here, for example, the matrix 801 is related to the matrix 802 via the semantic relation in the semantic relation table 602, such that "a manager is a person who directs Acme?" is "Sue."

Example Logic for Searching

Figure 9:
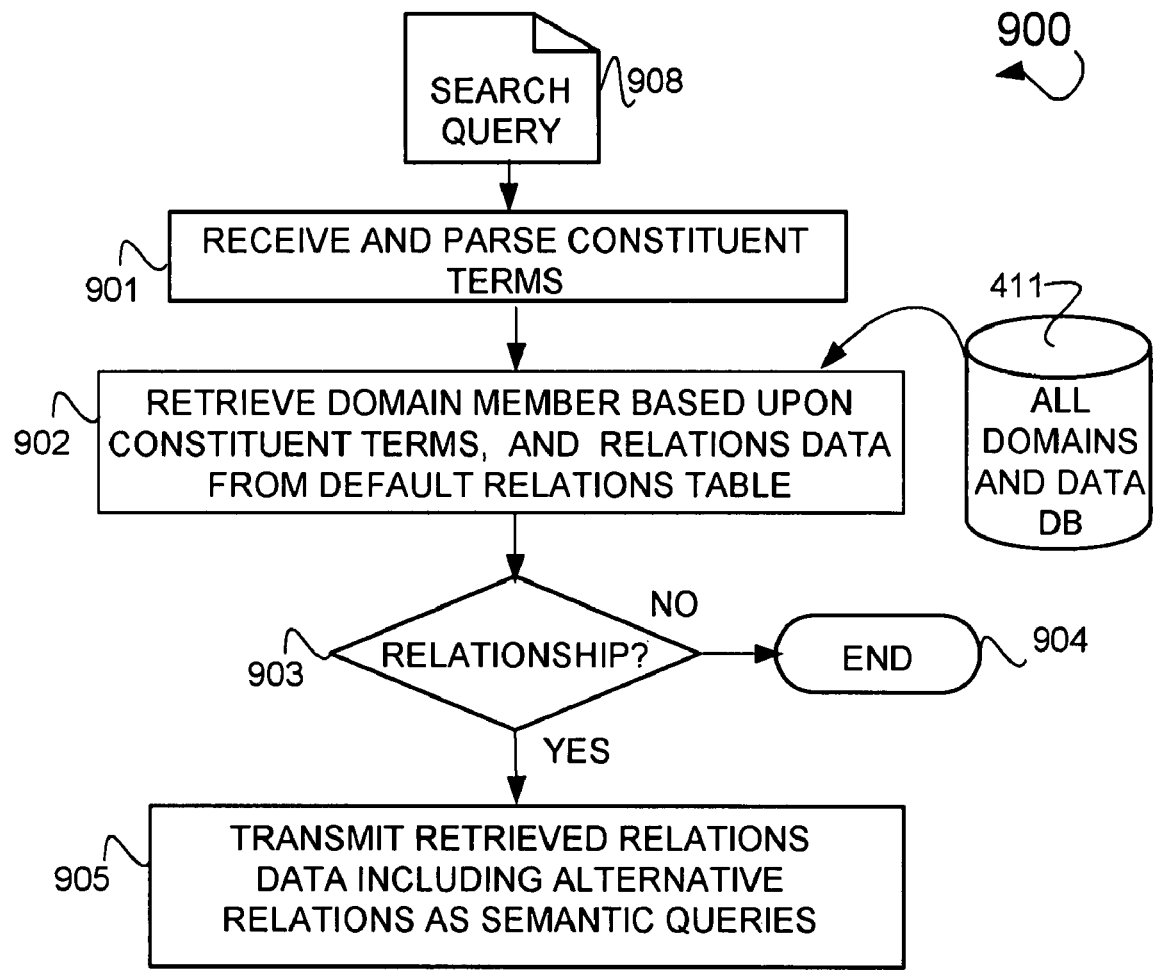
FIG. 9 is a flow chart illustrating an execution of a query engine using a default relations table, according to an example embodiment.

FIG. 9 is a flow chart illustrating an example execution of a query engine (see e.g., FIG. 14 below) using a default relations table. Illustrated is an operation 901 that, when executed, receives a tuple entry or attribute data. Next, an operation 902 is executed that retrieves relations data (e.g., a semantic relation) from a default relations table. This default relations table may be predetermined by an administrator 401, or even a user, to be used. Then, a decisional operation 903 is executed that determines whether additional attribute data or tuple entry needs to be processed, and the semantic relations for that tuple entry or attribute data. In cases where decisional operation 903 evaluates to "no" (i.e., false), the operation 904 is executed, and the method ends. In cases where decisional operation 903 evaluates to "yes" (i.e., true), an operation 905 is executed that retrieves relations data (e.g., semantic relations) including all alternative relations data (e.g., semantic relations) that may be utilized. This relations data may then be prepared to be used to relate two or more attributes or tuple entries.

Figure 10:
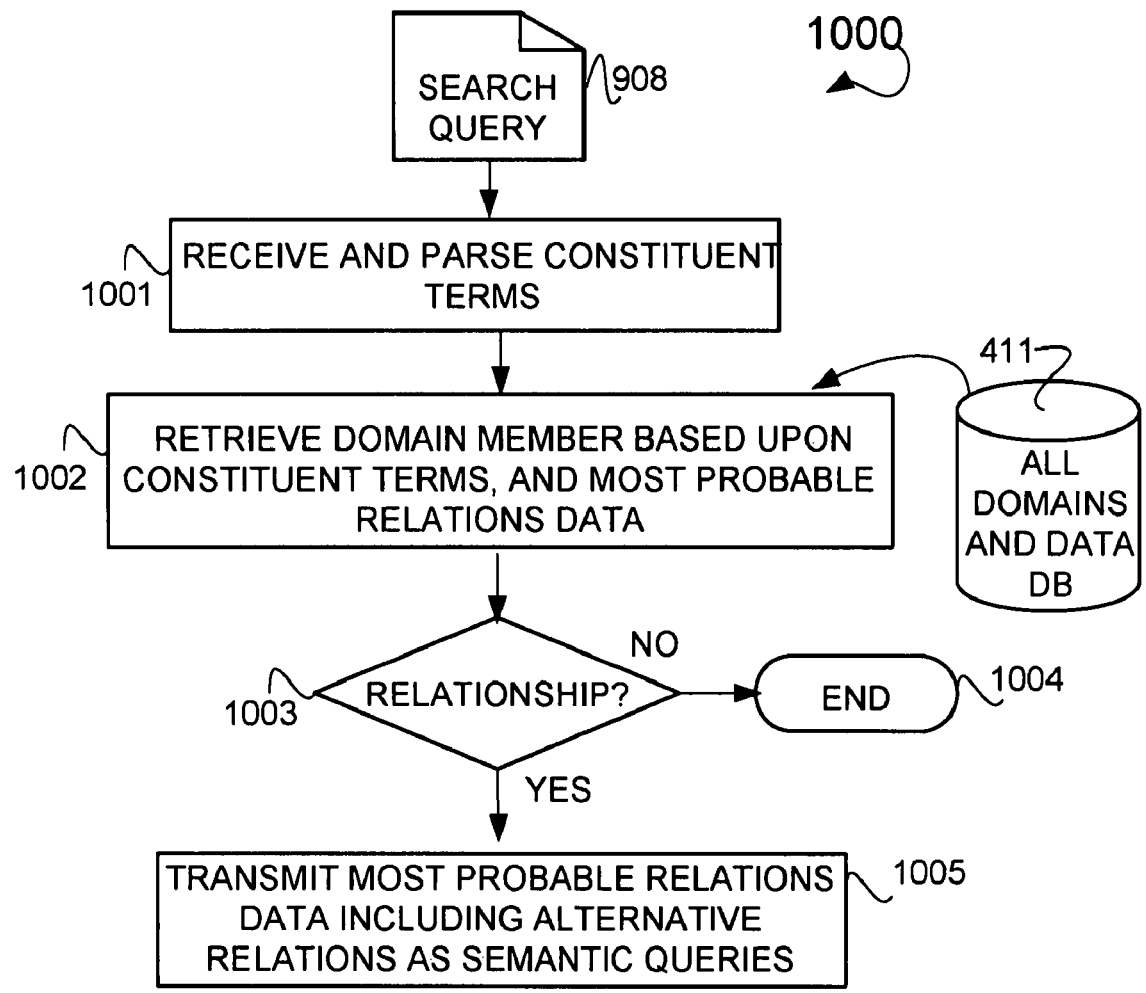
FIG. 10 is a flow chart illustrating a execution of a query engine using a probability-based relations table, according to an example embodiment.

FIG. 10 is a flow chart illustrating an example execution of a query engine (see e.g., FIG. 14 below) using a probability-based relations table. Shown is an operation 1001 that, when executed, receives a tuple entry or attribute data. Once the data is received, an operation 1002 is executed that retrieves the most probable relations data. This relations data (e.g., semantic relations) is retrieved from, for example, the all domains and data database 411. This probability may be based upon semantic relations most commonly used to link tuple entries or attribute data. The notion of "commonly used" may include those selected for use by a user or even an administrator 401. Next, a decisional operation 1003 is executed, such that where this operation evaluates to "no" (e.g., false), the method ends. In cases where decisional operation 1003 evaluates to "yes" (e.g., true), then a relationship is determined to exist between members of a domain based upon some type of probability value or values. An operation 1005 is subsequently executed after decisional operation 1003 evaluates to "yes" (e.g., "true") to transmit these most probable semantic relations including alternative relations. This relations data may then also be prepared to be used to relate two or more attributes or tuple entries.

Figure 11:
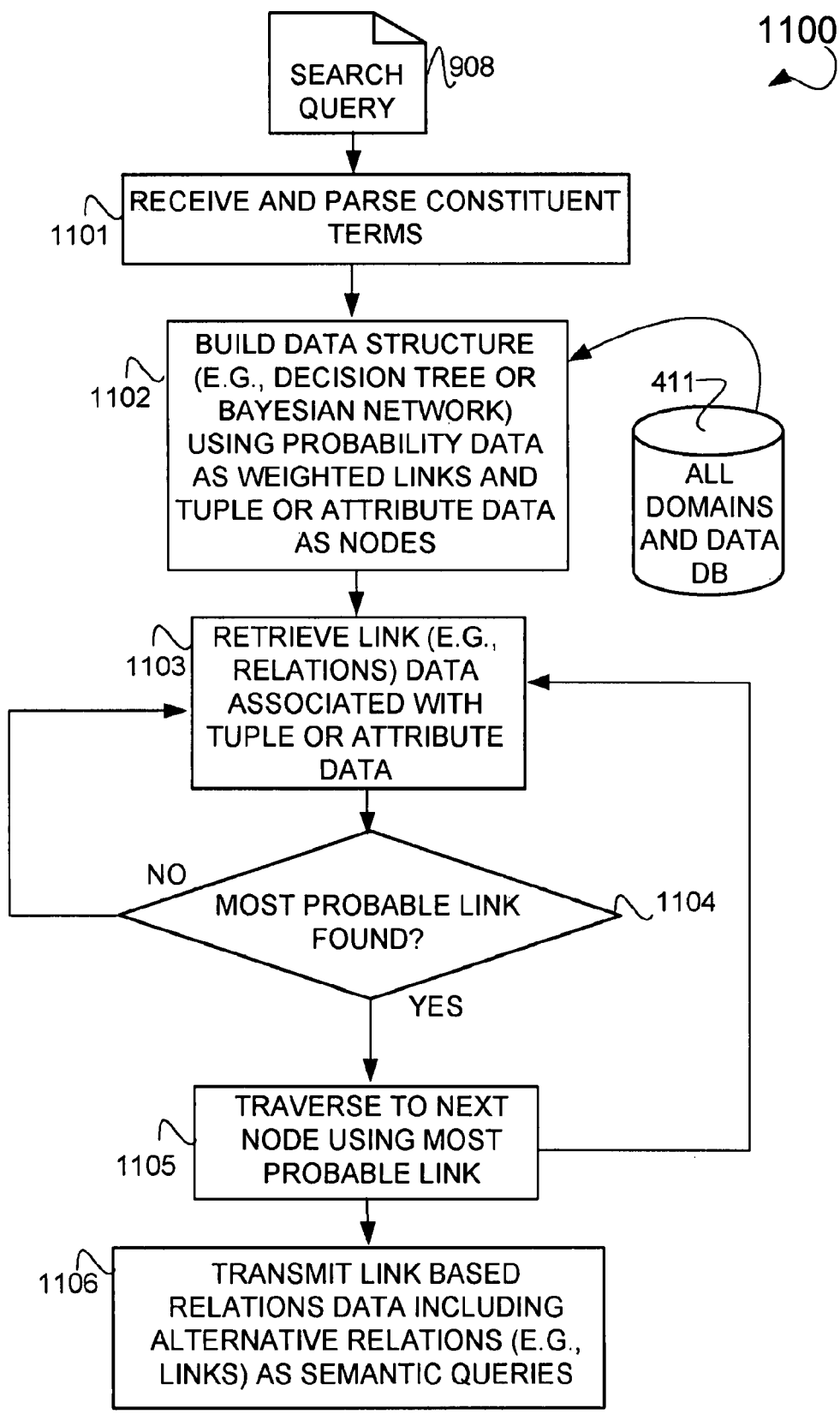
FIG. 11 is a flow chart illustrating a method used to implement a query engine, wherein certain principles of Artificial Intelligence (AI) are used to determine the appropriate semantic relation to be used to relate two or more tuple entries or pieces of attribute data, according to an example embodiment.

FIG. 11 is a flow chart illustrating an example method used to implement (see e.g., FIG. 14 below) query engine wherein certain principles of AI are used to determine the appropriate semantic relation to be used to relate two or more tuple entries or pieces of attribute data. Illustrated is an operation 1101 that, when executed, facilitates the receipt of a tuple entry or attribute data. Once received, an operation 1102 is executed probability data associated with a node. This node may contain data relating to a semantic relation. These links and nodes are retrieved from an all domains and data database 411. Next, an operation 1103 is executed that retrieves the weighted value from a particular link associated with a tuple or attribute data (e.g., a node). Next, a decisional operation 1104 is executed such that when the decisional operation 1104 evaluates to "no" (i.e., false), the operation 1103 is re-executed. In cases where decisional operation 1004 evaluates to "yes" (i.e., true), an operation 1105 is executed that traverses to the next node using the most probable link (e.g., the link with the highest weight). Next, the operation 1103 is re-executed, where an additional link exists. When no additional links exist, then an operation 1106 is executed that transmits link-based relations data.

Figure 12:
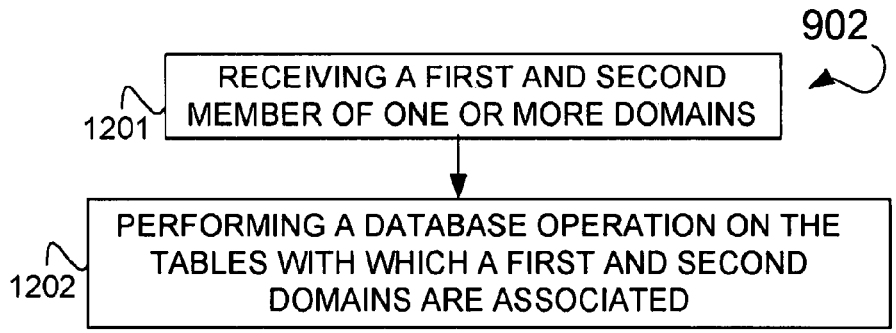
FIG. 12 is a flow chart illustrating an method used to determine a relation between two or more members of a domain or domains based upon the existence of various database operations applicable to these members, according to an example embodiment.

FIG. 12 is a flow chart illustrating an example method used to implement operation 902. Illustrated is an operation 1201 that receives a first and second member of a domain. Next, an operation 1202 is executed that performs a database operation on the tables with which the first and second members are associated, and where a relationship exists between these first and second members a boolean value is returned denoting whether a relationship between these two members does or does not exist. This same operation may be applied with respect to operation 1002.

Figure 13:
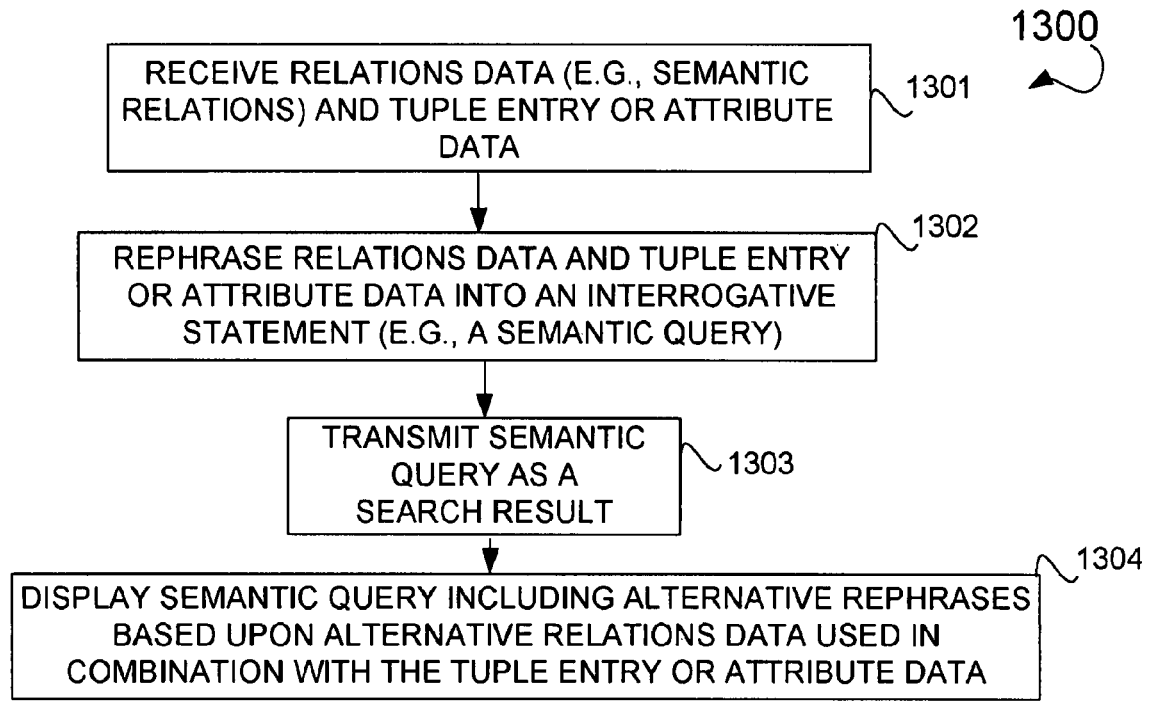
FIG. 13 is a flow chart illustrating a method used to generate a semantic query, according to an example embodiment.

FIG. 13 is a flow chart illustrating an example method 1300 used to generate a semantic query. Shown is an operation 1301 that, when executed, receives relations data and tuple entry and attribute data. Once received, the relations data and tuple entry or attribute data is rephrased into an interrogative statement (e.g., a semantic query) via an operation 1302. Any alternative rephrases are also turned into interrogative statements. Next, an operation 1303 is executed that transmits the semantic query as a search result. Then, an operation 1304 is executed that displays the semantic query including all alternative rephrases.

Figure 14:
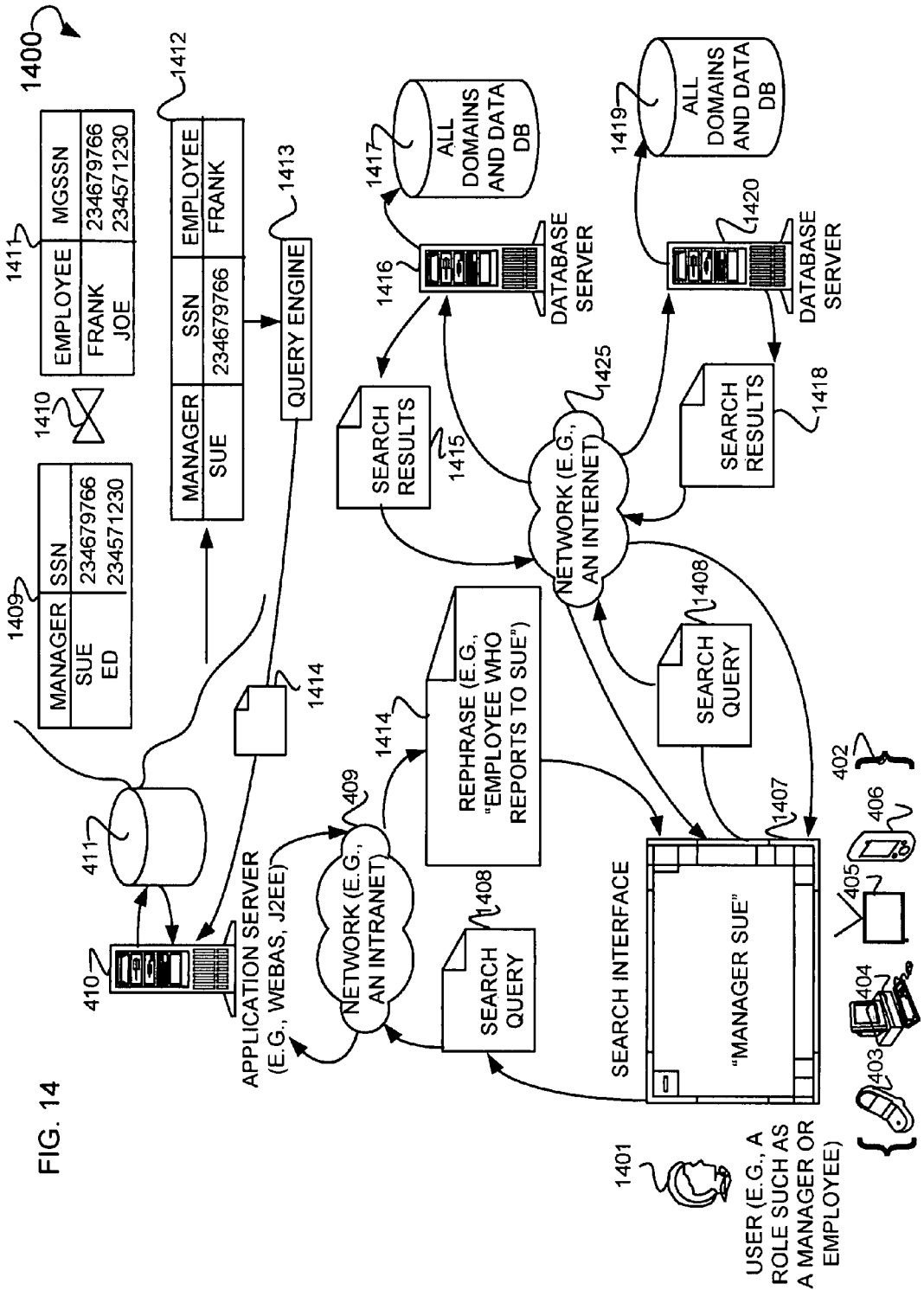
FIG. 14 is a diagram illustrating a system used to make search queries and return search results, according to an example embodiment.

FIG. 14 is a diagram illustrating an example system 1400 used to make search queries and return search results. Illustrated is user 1401 who, using any one of a number of devices 402, including a cell phone 403, a computer system 404, a television 405, and/or a PDA 406, may execute a search interface 1407. Using this search interface 1407, a search query is sent across a network 409 as a search query data packet 1408. The search query data packet 1408 may be a data stream or packet, and may be formatted in XML. In some cases network 409 may be an intranet, or in other cases it may be the internet. The search query data packet 1408 is sent across the network 409 to an application server 410. Once the search query data packet 1408 is received by the application server 410, it is parsed, or otherwise processed, and stored to an all domains and data database 411. In some cases, the search query data packet 1408 is also sent across a network 1425, where this network 1425 is, for example, the internet or an intranet. Once sent across to network 1425, the search query data packet 1408 is sent to any one of a number of database servers such as database servers 1416 and 1420. The database servers 1416 are connected to one or more domain databases 1417 and 1419. Further, an application server may be used in combination with the database servers 1416 and 1420, which may be a web server and/or other device (e.g., computer systems) having the functionality of an applications server, web server, and/or database server. In response to the search query data packet 1408, the application server 410 and database servers 1416 and 1420 each may return search results 1415 and 1418 to the user 1401 using any one of a number of devices 402 These search results may, in some embodiments, be data from databases that is turned into a semantic query by one of the devices 402 or even the application server 410. In addition to search results 1415 and 1418, a rephrase 1414 may be sent by the application server 410 to the user 1401, again using any one of a number of devices 402. The search results 1418 may be displayed on the search interface 1407. In certain cases, the application server 410 may provide search services (e.g., host) to users who are not a part of the organization operating the application server 410.

Some embodiments may include a query engine 1413 that processes the results of various database operations. For example, a search may be conducted for the terms "manager" and "Sue". This search may include both table attributes and tuple values contained within each table. Illustrated is a table 1409 containing manager-related data uniquely identified via a social security number (e.g., "SSN"). The table 1409 is joined (see e.g., join operation 1410) with a table 1411. Contained within the table 1411 is employee data, where each employee is uniquely identified by their manager's social security number (e.g., "MGSSN"). The result of the join operation 1410 is reflected in table 1412, where it can be inferred that "Sue" is a manager of "Frank". This table 1412 is then passed through the query engine 1413 to generate the rephrase 1414 (e.g., a semantic query), wherein "Employee" and "Sue", are related via the semantic relationship "who reports to".

Example embodiments may include table attributes pertaining to data related to various business processes, the results of such processes, and generalized descriptions of such processes. For example, these table attributes may include sales order data, purchase order data, employee job applications, scrap reports, production data reports, product development progress reports, or some other suitable attribute data. Further, these attributes may include product information (e.g., product specifications), customer information (e.g., address, contact information etc), vendor information (e.g., address and contact information), production plant information, and other suitable information.

Figure 15:
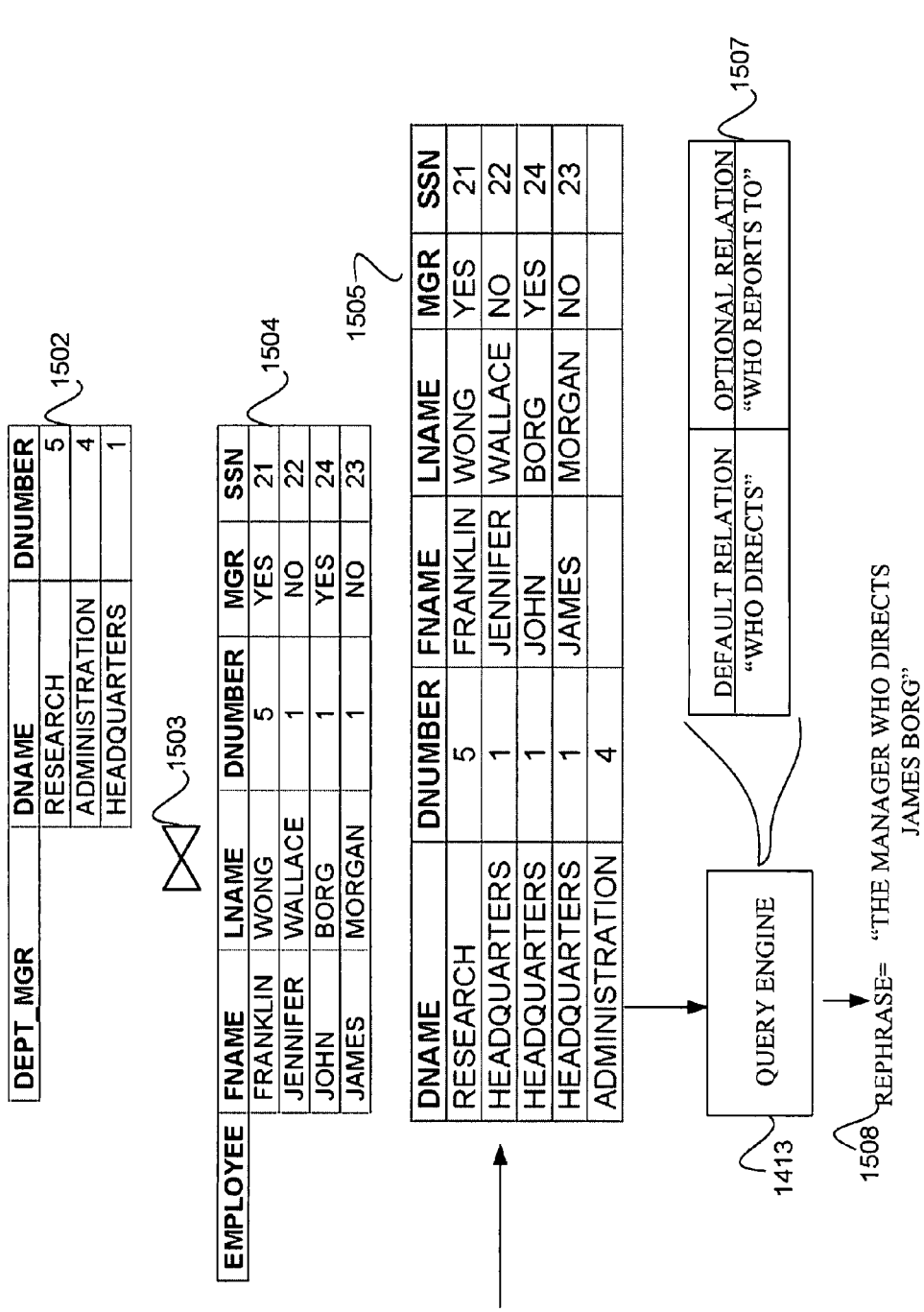
FIG. 15 is a diagram of a result of the execution of a query engine using a using a single default relation and optional relation, according to an example embodiment.

FIG. 15 is a diagram of an example result 1500 of the execution of a query engine 1413 using a single default relation and optional relation. Illustrated is a search query 1501 in the form of the phrase "manager James". This search query is parsed into the terms "manager" and "James". A search is then performed (e.g., in all domains and data database 411) for database tables containing these terms, such that a table 1502 titled Dept_Mgr is retrieved and a table 1504 titled Employee is retrieved. This search may include both table attributes and tuple values contained within each table. In some cases, a search may be performed for attributes of tables containing the search terms or search phrases, while in other cases particular tuples containing these terms or phrases will be searched. Next, a join operation 1503 (e.g., using the DNUMBER value) is executed on the tables 1502 and 1504 such that a table 1505 is generated. This table 1505 contains a set of related data. Table 1505 contains a tuple entry for "James", such that this tuple entry is provided to the query engine 1413, and a default relation (e.g., "who directs") is retrieved from a default relation table 1507. When the tuple entry for "James" is retrieved and the default relation combined with it, the result is the rephrase 1508 "the manager who directs James Borg", who here is "John Borg" a rephrase result.

Figure 16:
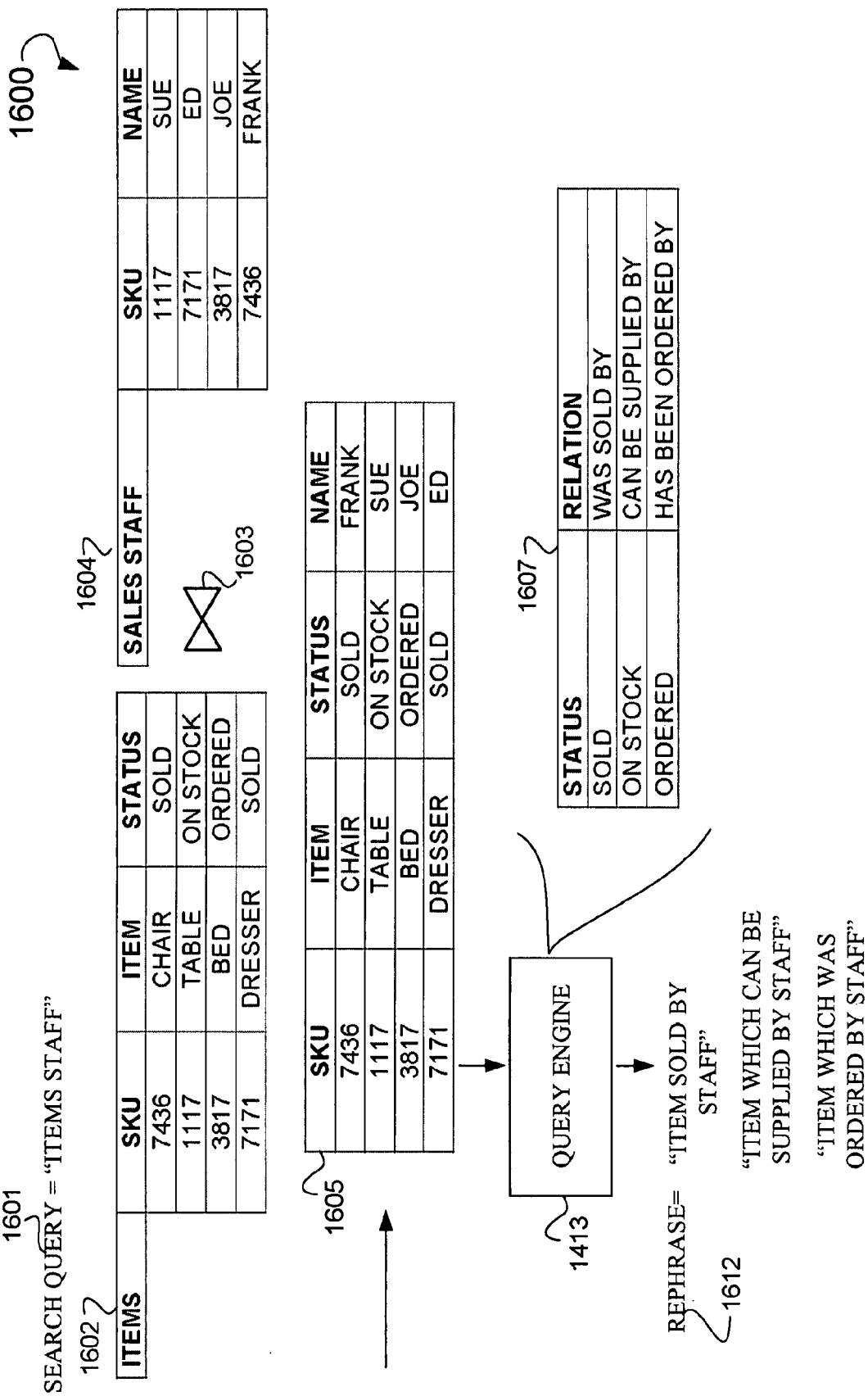
FIG. 16 is a diagram of a result of the execution of a query engine using a various default relations in association with status information, according to an example embodiment.

FIG. 16 is a diagram of an example result 1600 of the execution of a query engine 1413 using various default relations in association with status information. Illustrated is a search query 1601 (e.g., "item staff"). Search query 1601 is parsed into the terms "items" and "staff", and a search is conducted for these terms in a database (e.g., in all domains and data database 411). This search may include both table attributes and tuple values contained within each table. As a result of this search, a table 1602 titled "item" and a table 1604 titled "sales staff sales" are returned. By performing a join operation 1603, a table 1605 is generated, where the join is based upon a Stock Keeping Unit (SKU) value. This table 1605 contains a set of related data. Table 1605 and the data contained therein is passed to the search query engine 1413 that performs a rephrase based upon various relations as reflected in the table 1607. Upon the execution of the query engine 1413, a rephrase 1612 is generated in the form of "item sold by staff". Additional rephrases are also illustrated including "items which can be supplied by staff", and "item which was ordered by staff". Based on these rephrases, certain rephrase results may be generated including "Frank who sold a chair", or "contact Joe" just to name a few.

Figure 17:
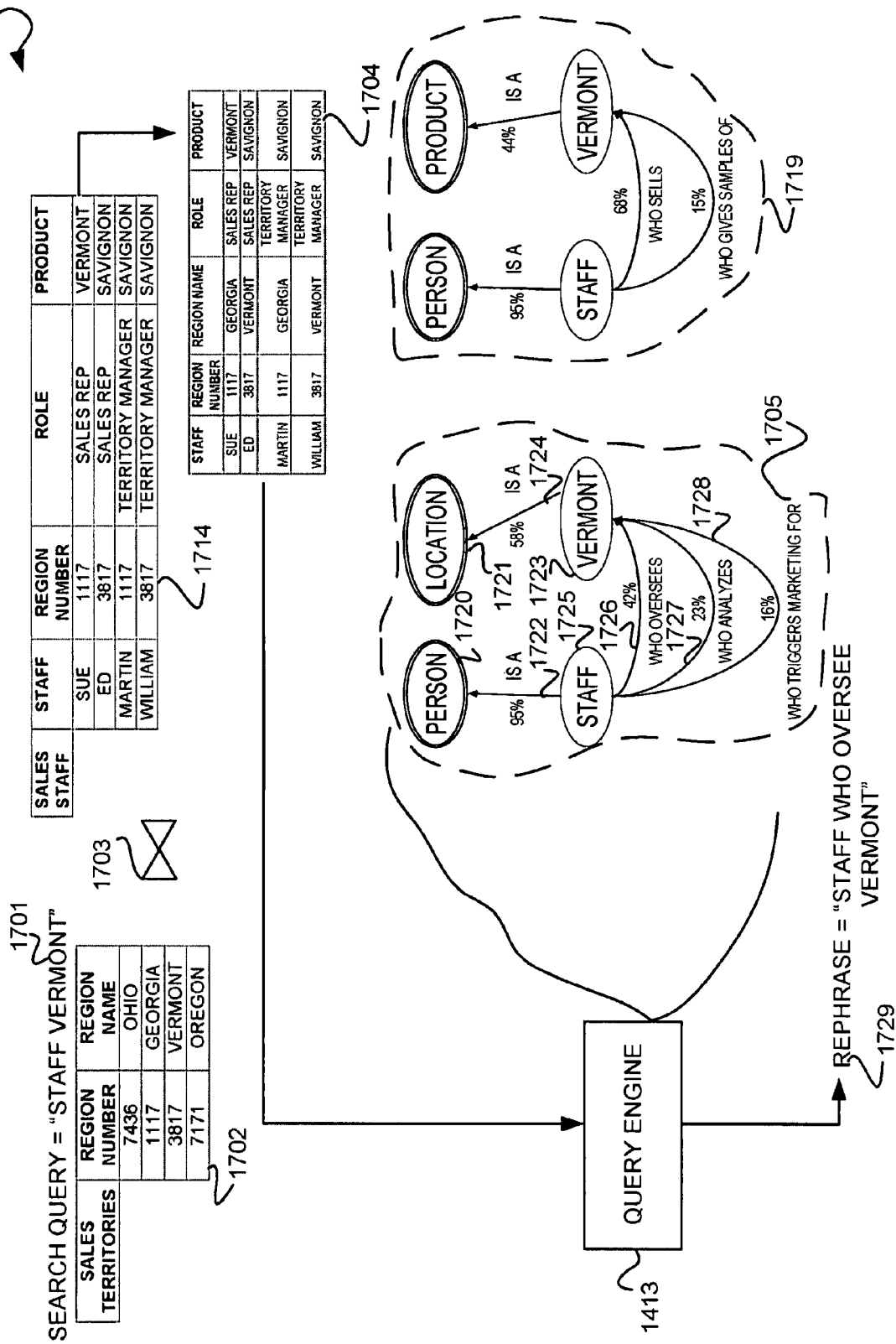
FIG. 17 is a diagram of an example result of the execution of a query engine using various semantic trees, according to an example embodiment.

FIG. 17 is a diagram of an example result 1700 of the execution of a query engine 1413 using various semantic trees. Shown is a search query 1701 with the terms "STAFF VERMONT". This search query 1701 is then parsed into the terms "STAFF" and "VERMONT". A search is then conducted in one or more of the databases (e.g., in all domains and data database 411) for an attribute or tuple value containing the term "staff" or "Vermont". Here the search returns a table 1702 titled "sales territories" containing a tuple titled "Vermont". Also returned is a table 1703 containing an attribute titled "staff". Applying a join operation 1703, a table 1704 is generated. This table 1704 contains a set of related data. Table 1704 is then passed into the query engine 1413. This query engine 1413 generates one or more semantic maps such as semantic maps 1705 and 1719. With regard to semantic map 1705 a number of nodes are illustrated such as a domain node person 1720, and domain location node 1721. The node staff is part of the domain of person, and hence linked to the domain person node 1720 via the edge 1722. Associated with this edge 1722 is a percentage value of 95% denoting the probability that the staff node 1725 is a member of the domain of person. Further, an edge 1724 connects the Vermont node 1723 to the domain location node 1721, wherein an edge 1724 denotes that there is a 58% probability that Vermont is in the domain of location.

Various edges representing semantic relations are also illustrated in FIG. 17. There is a 42% probability that the staff node 1725 oversees the Vermont node 1723 as illustrated by edge 1726. Further, the staff node 1725 and the staff member associated with this node has a 23% probability that they analyze Vermont (see e.g., edge 1727). Also, there is a 16% probability, as illustrated by edge 1728, that the staff node 1725, and the person associated with it, triggers marketing for Vermont (see e.g., edge 1728). In some embodiments, the semantic relation as illustrated by edge 1726 is used by the query engine 1413 to generate a rephrase 1729 "STAFF WHO OVERSEE VERMONT". This use of percentages may be overridden by a user via the use of a default relation as an expression of mixed initiative semantic searching.

Example Interfaces for Searching

In some embodiments, a selection device, such as a mouse guiding a screen pointer, a light pen, touch screen, or other suitable device is used to generate an input signal (e.g., a semantic query or a search query) reflecting a desire on the part of the user 1401 to manipulate or otherwise change data presented on a display. The display may be a computer monitor or other suitable medium for presenting data. The presented data may be formatted using a floor plan divided into display areas (e.g. status display areas, message areas, feedback areas) and input areas (e.g., layout elements such as columns, tables, and panes) that can receive input via various widgets or objects including input specification widgets in the form of text boxes, or a combination thereof. Some well-known technologies used to generate a UI include, for example, a web page written using a Hyper Text Markup Language (HTML), and controlled by display logic written using JavaScript™, or VBScript™.

In some embodiments, a Voice User Interface (VUI) may be used in lieu of or in addition to a UI to allow a user 1401 to generate search queries. For example, in one embodiment a voice-based browser may be used to conduct searches and to provide search results and semantic queries to a user 1401. Such a browser may use, for example, web pages written using a voice based XML (e.g., Voice XML). Further, in some cases, some type of speech recognition software may be used to facilitate the generating of search queries and providing of search results and semantic queries to a user 1401.

Some embodiments may include one or more interfaces used to facilitate semantic searching. Common to these interfaces are a number of fields containing objects and widgets (e.g., UI elements) associated with columns, tables, panes, containers, and other suitable formatting objects (e.g., layout elements). In many cases the UI elements are inserted into the layout elements. These layout elements, in turn, reside in a layout as part of a floor plan. Technologies that may be used to implement these various UI elements and layout elements include: Cascading Style Sheets (CSS), a Hyper Text Markup Language (HTML), and even Asynchronous JavaScript and XML (AJAX) in the case of UI elements. In certain cases, AJAX may be used to merge certain functionality (see e.g., #A and #B illustrated below) using a dynamic rendering of possible term-domain assignments from which users may select at the time of entering their search terms. Put another way, a UI element written using AJAX may be used to assign a search query to a domain.

Some example layout elements include:
- an input area (#A): The input area that allows the user to specify the search terms;
- an input specification widget (#B): The input specification area that allows the user to assign search terms to domains;
- a best hit header area (#C): The best hit header area displays the header of the semantic query that is chosen as the most prominent default interpretation of semantic relations (e.g., the best match for the search query) between nodes in a domain or across domains to which search terms have been assigned;
- a best hits area (#D): The best hits area displays the most prominent search results that are based on the default interpretation of domain relations (e.g., as identified within the best hit header area #C, in terms of a rephrase);
- a relations area (#E): Based on the domain assignments, for each set of search terms a number of semantic relations are suggested and presented as a semantic query in a natural language (NL) form. While the best hit header area #D features the most prominent semantic query, the relations area #E lists optional semantic queries. The user can choose any of these semantic queries from the relations area #E, in order to prompt refreshes of the best hit header area #C as well as items in the best hits area #D, the relations area (#E), the additional results area #F, and, finally, the related actions area #G. The refresh in the relations area #E could feature the semantic query that was previously featured in the best hit header area;
- an additional results area (#F): The additional results area features search results that belong to the same semantic relation as featured in the best hit header area (as a semantic query), but that are not shown in the best hits Area #D;
- a related actions area (#G): The related actions area features actions that can be either applied to any of the search results, or, optionally, that may match any user requirements associated with the search task. Further, a related action may reflect any of the search terms (e.g., other than in terms of the functionality that is supported by help of domain assignments and/or semantic relations). Triggering any item in the related actions area can bring up a new and separate application (e.g., in its own window, with its own UI).

In some embodiments, a UI design is illustrated that encompasses the floor plan of the UI and provides, for each application part, one or several design variants. The rationale for the UI design is to optimally support users' tasks and to provide users with a way to accept prominent recommendations, based on domain assignments and semantic relations. Further, the UI is to support users in choosing rephrases of semantic relations in order to get closer to the identification of their needed or expected search results.

Example embodiments may include a floor plan that is directly tied to the application parts as specified in the previous section. On the level of the UI, each application part is portrayed as an area of the floor plan. To optimize the task support for users, areas #A and #B can be combined (see e.g., FIG. 18) since this allows users to simultaneously enter their search terms and assign them to available domains. There are a number of other optional instances of the floor plan. For example, the relations area #E can be below the best hits area #D or above the best hit header area #C. Also, there can be different design implementations for each floor plan area. For example, the controls for adding or removing input fields in areas #A and #B can appear differently or be arranged at different locations within the same areas. Regarding the best hits area #D, a different set of search results can be displayed, specifically, for example, a single result only can be displayed with an additional link "More" to display more results. Alternatively, a list of search result headers can be displayed for which details can be displayed in a separate frame of the area. Alternatively, for each of the previews of prominent search results (e.g., the best hits that are shown as thumbnails), more detailed information can be displayed in the area of the most prominent search result (e.g., the best matches replacing the contents during a mouse over function being performed on the preview area).

Figure 18:
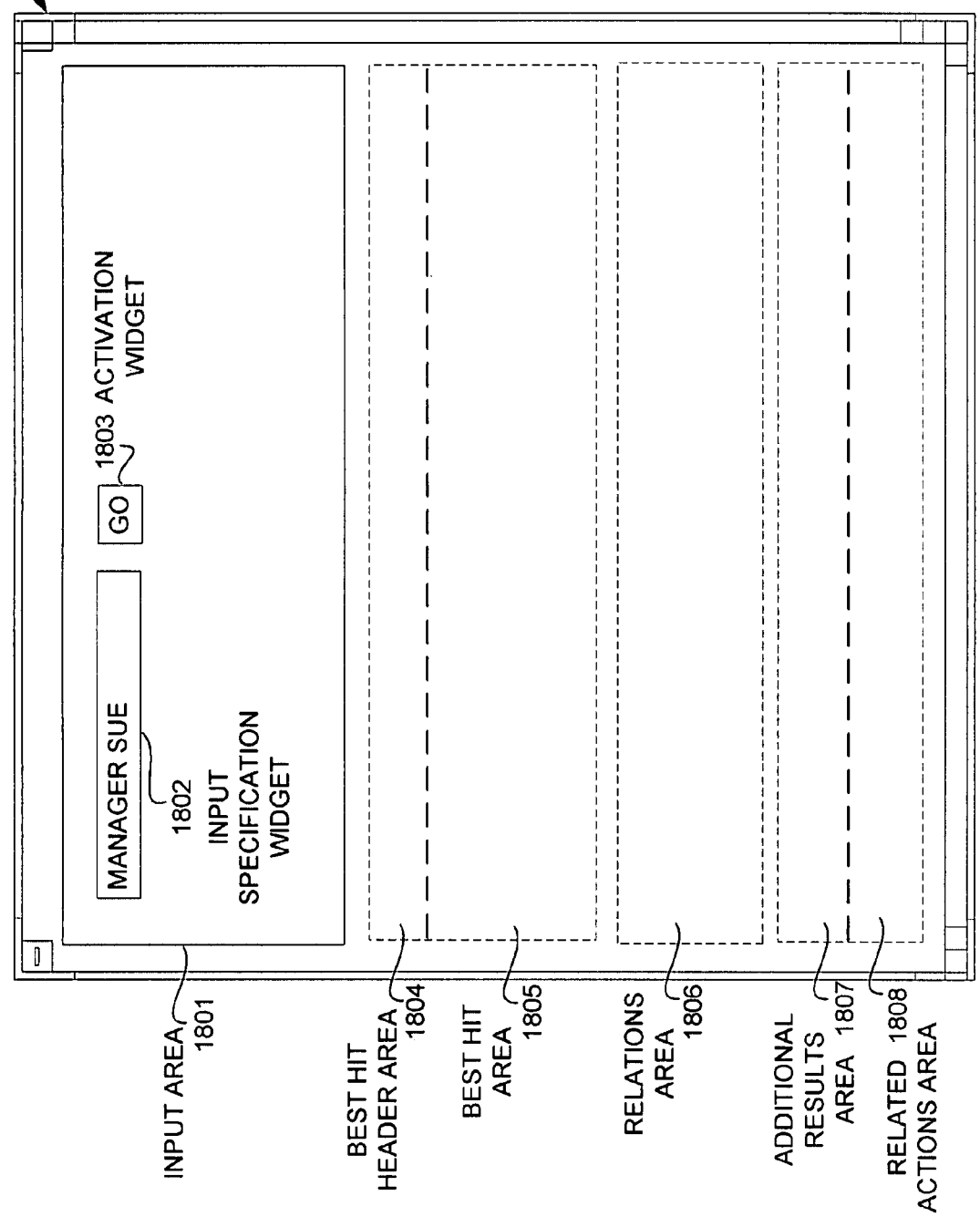
FIG. 18 is a diagram of a User Interface (UI) illustrating an input specification widget, according to an example embodiment.

FIG. 18 is a diagram of an example UI 1800 illustrating an input specification widget 1802. In some cases, rather than a plurality of search widgets being displayed in the input area of a UI, only one search widget may be provided. In cases where only one search widget is provided, any search query provided to this input specification widget 1802 may be used to search across multiple domains at once, as opposed to searching through specific domains. Illustrated is an input area 1801 (e.g., #A) containing an input specification widget 1802 and an activation widget 1803 (e.g., a button or other suitable widget or object) that is used to send the input provided to the input specification widget 1802 to, for example, the application server 410. Input specification widget 1802 (e.g., #B) may, for example, be a textbox into which a textual description in the form of search query (e.g., a search query used to generate a search query data packet 1408) may be entered. Additionally, illustrated is a best hit header area 1804 (e.g., #C), wherein the search result that most closely corresponds to the search query data packet 1408 will be displayed. Next, a best hits area 1805 (e.g., #D) is illustrated where certain semantic queries may appear. These semantic queries, as will be more fully illustrated below, may be presented in the form of a rephrasing of a node and its particular semantic relation to another node (e.g., rephrasing as a semantic query). Additionally illustrated is a relations area 1806 (e.g., #E). This relations area 1806 may contain semantic queries. Further, an additional results area 1807 (e.g., #F) is also illustrated that may display additional search results retrieved from, for example, the database servers 1416 and/or 1420. Moreover, a related actions area 1808 (e.g., #G) is also illustrated that provides information relating to certain types of ancillary data that may be related to the data displayed in the additional results area. In certain cases, a user 1401 may be able to specify a preferred relation or select from a set of system-recommended relations that may be dynamically created and presented on the basis of search terms, their assignments to domains, or any combinations thereof.

Figure 19:
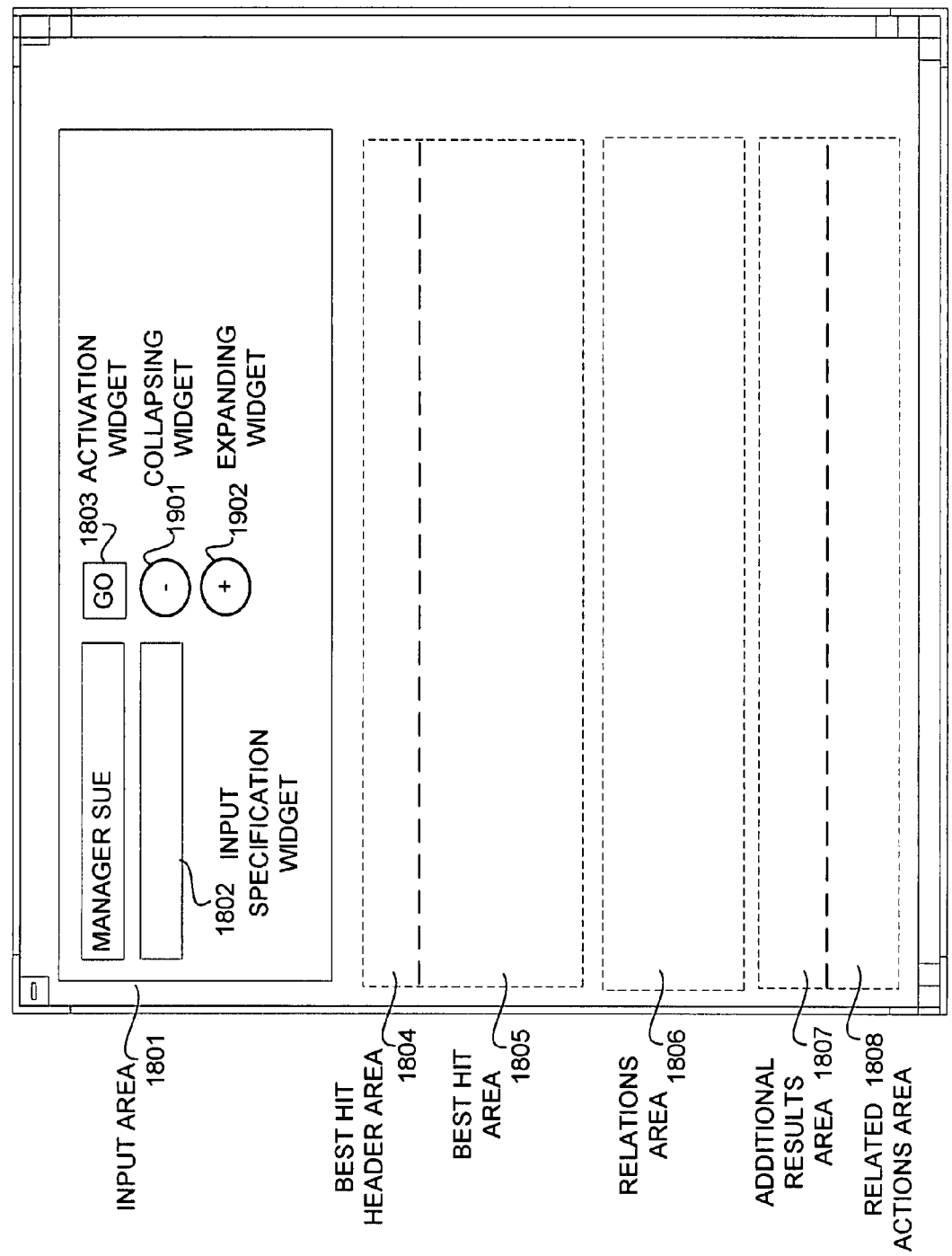
FIG. 19 is a diagram of a UI illustrating an advanced search widget "A" that contains common search widgets and expanding and collapsing widgets, according to an example embodiment.

FIG. 19 is a diagram of an example UI 1900 illustrating an advanced search widget "A" that contains common search widgets and expanding and collapsing widgets. Illustrated are the previously illustrated input specification widget 1802, an expanding widget 1902, and a collapsing widget 1901. In some embodiments, a user 1401 may be able to add an input field using the expanding widget 1902, or remove an input field using the collapsing widget 1901, such that the user 1401 may be able to conduct searches on specific domains. Additionally, the user 1401 may be able to search across multiple domains depending upon which input fields are added or removed.

Figure 20:
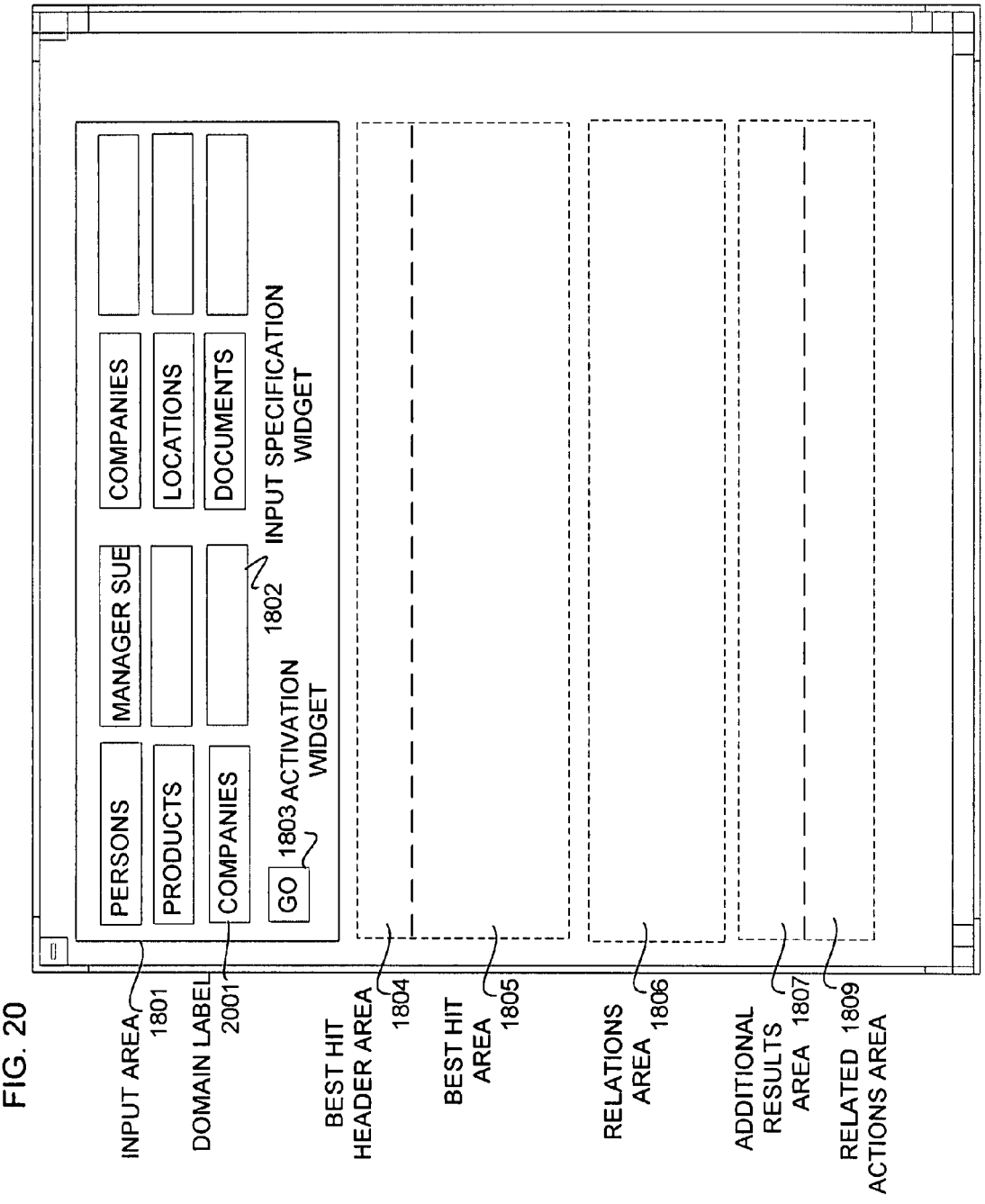
FIG. 20 is a diagram of a UI illustrating an advanced search widget "B" that includes an activation widget (e.g., a button) and various domain labels, according to an example embodiment.

FIG. 20 is a diagram of an example UI 2000 illustrating an advanced search widget "B" that includes an activation widget 1803 (e.g., a button) and various domain labels 2001. Through the use of multiple input specification widgets 1802, a user 1401 may be able to search specific domains relating to, for example, "persons", "products", "companies", and "locations" to name just a few of the domains.

Figure 21:
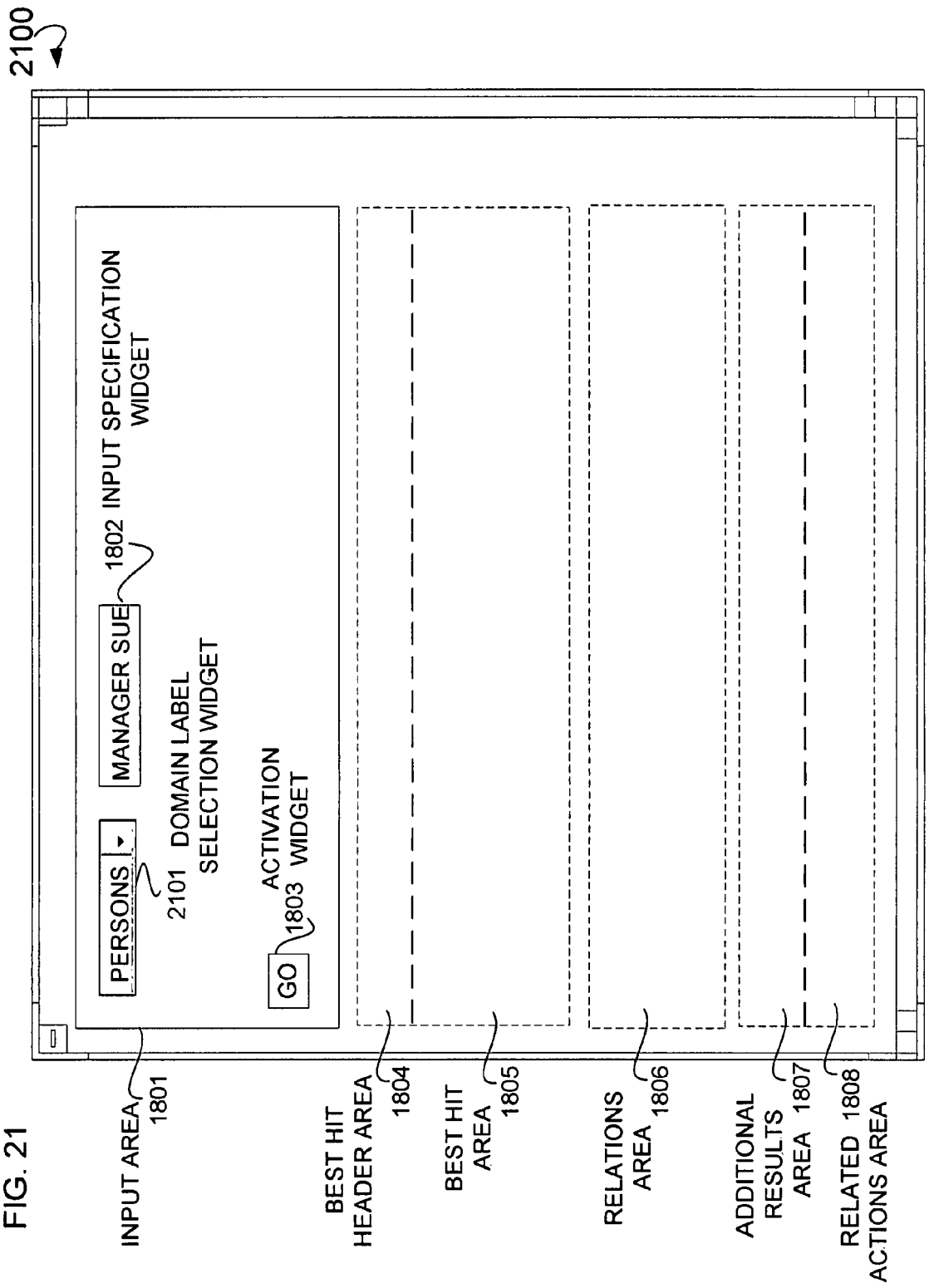
FIG. 21 is a diagram of a UI illustrating an advanced search widget "C" that includes a domain label selection widget and an input specification widget, according to an example embodiment.

FIG. 21 is a diagram of an example UI 2100 illustrating an advanced search widget "C" that includes a domain label selection widget 2101 and input specification widget 1802. Shown is a domain label selection widget 2101 that allows a user 1401 to select from multiple domains using a single widget, which in this case is a drop down menu. Also illustrated is an input specification widget 1802 in the form of a text box that allows a user 1401 to provide search terms (e.g., make a search query) corresponding to the domain selected using the domain label selection widget 2101. The domain label section widget 2101, input specification widget 1802 and an activation widget 1803 all reside as part of the input area 1801.

FIG. 22 is a diagram of an example UI 2200 illustrating possible dynamic behavior manifested by a UI. Shown is an input field 2201 in the form of, for example, a UI element (e.g., a text box) that allows a user 1401 to enter a search query. As illustrated, once the user 1401 enters the first few characters of the search query, a drop down menu 2202 may appear that may allow the user 1401 to narrow their search by selecting certain suggestions. Here shown are possible selections such as "Java ISA Product," "Java ISAN Event," "Java ISA Location," and "Java ISA Document." These selections are provided in response to the entry by the user 1401 of the letters "Jav." Also illustrated is an advanced search link 2203 that may, in some cases, allow the user 1401 to conduct a domain specific search such as is reflected in FIG. 20, facilitated by an input specification widget 1802. Moreover, expanding and collapsing widgets 1902 and 1901 are also shown to add or remove optional domain-specific search capabilities.

FIG. 23 is a diagram of an example UI 2300 illustrating possible dynamic behavior manifested by a UI where possible search queries are broken down into sub-queries. Illustrated is a UI element 2301 (e.g., a text box) that allows a user 1401 to enter a search query data packet 1408. As with the UI in FIG. 21, in cases where a partial search query is provided, a drop down menu 2102 will be displayed. Different from the UI in FIG. 21, however, a drop down menu 2302 is illustrated that contains a field to allow a user 1401 to select a further refined search suggestion. Here, for example, experts in Java relating to products, events, locations, and documents are shown. Further, an advanced search link 2303 with functionality similar to advanced search link 2003 is also illustrated.

Figure 24:
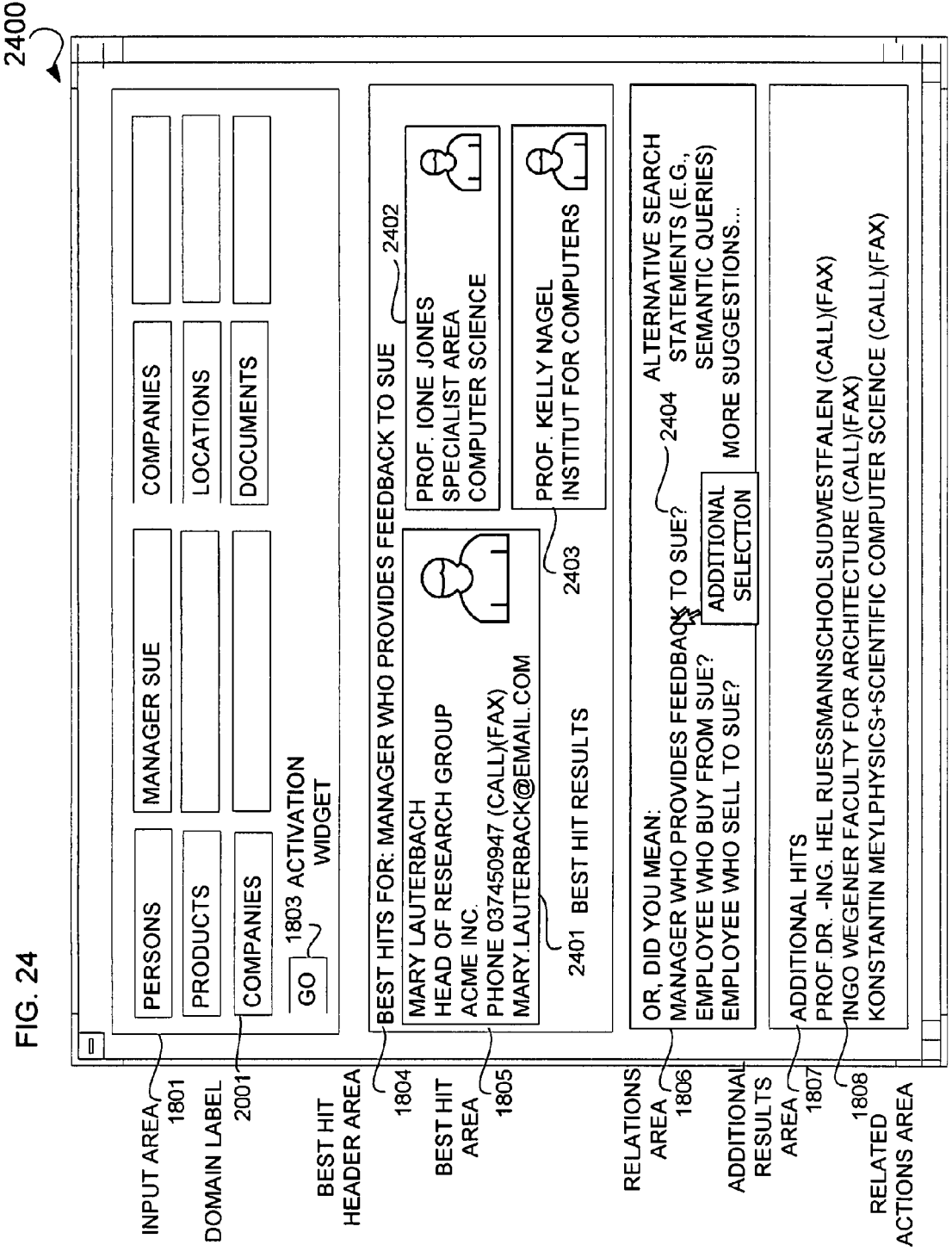
FIG. 24 is a diagram of a UI illustrating a best hits area containing various best hits results, according to an example embodiment.

FIG. 24 is a diagram of an example UI 2400. Illustrated is a best hits area 1805 containing various best hits results 2401, 2402, and 2403. Illustrated is a best hits result 2401 listing "Mary Lauterbach" as a result to the query "manager who provides feedback to Sue". Further, Ione Jones and Kelly Nagel (e.g., 2402 and 2403 respectively) are also illustrated. Shown in the relations area 1806 is a semantic query 2404 asking "manager who provides feedback to Sue?".

Figure 25:
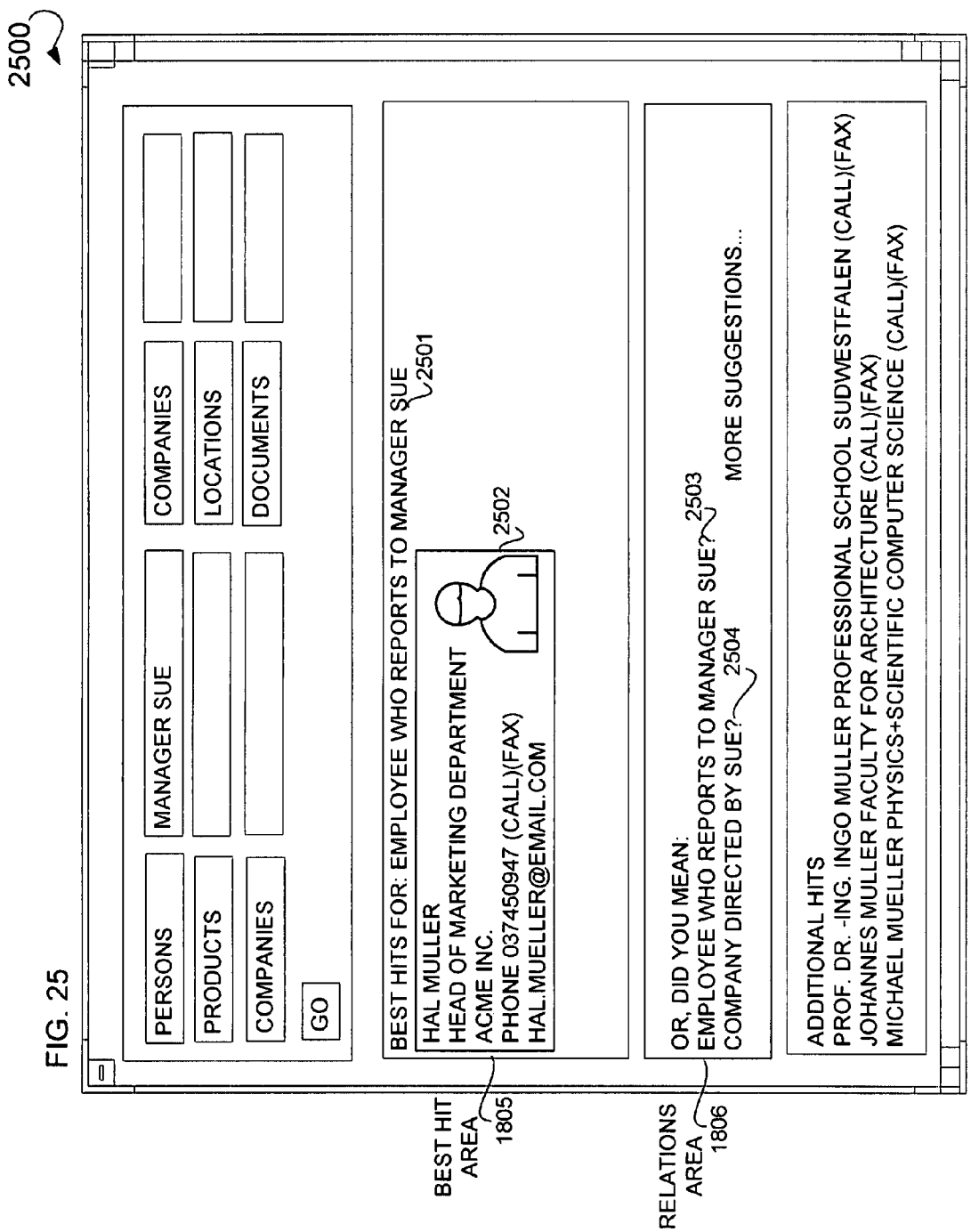
FIG. 25 is a diagram of a UI showing the result of the execution of the semantic query, according to an example embodiment.

FIG. 25 is a diagram of a UI 2500 showing the result of the execution of the semantic query 2404. Illustrated is a result for the semantic query 2404 as represented in the best hits area 1805, namely further represented in the best hits area 1805 as an entry 2502. Also illustrated is a relations area 1806 containing semantic relation 2503 "manager who hired Sue?" and relation 2504 "manager who is recommending Sue?"

Example Semantic Mapping

Figure 26:
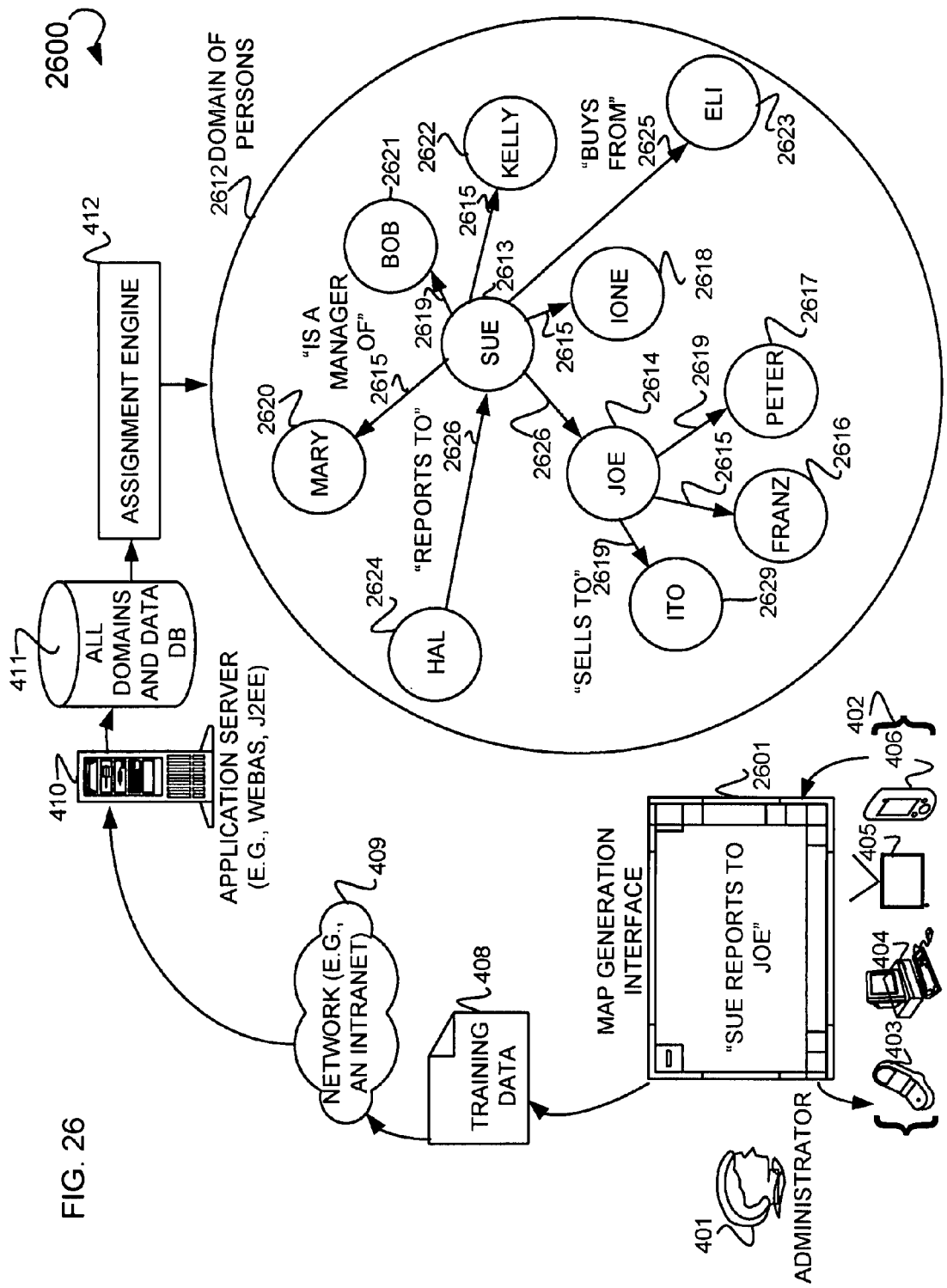
FIG. 26 is a diagram of a system illustrating the use of semantic mapping, in lieu of domains and tables, as a way to associate training data and domains, according to an example embodiment.

FIG. 26 is a diagram of an example system 2600 illustrating the use of semantic mapping, in lieu of domains and tables, as a way to associate training data and domains. Illustrated is an administrator 401 who, using a map generation interface 2601 that resides on any one of a number of devices 402, generates a training data packet 408. This training data packet 408 is transmitted across the network 409 to the application server 410 for ultimate storage on the all domains and data database 411. In some cases, training data packet 408 is stored as part of a semantic map by the assignment engine 412. A semantic map may be composed of nodes that are part of the same or distinct domains.

For example, a domain of persons 2612 has a number of nodes representing people (e.g., a semantic map of people). Connecting these various nodes is any one of a number of links in the form of semantic relations. For example, a node 2620 is linked to node 2613 by a semantic relation 2615, such that node 2613 titled "Sue" "is a manager of" (e.g., the semantic relation 2615) "Mary" as represented by node 2620. This semantic map reflects certain principles of graph theory, networks, and/or mapping that involve nodes and edges between nodes, referenced herein as semantic relations. Further, illustrated is a node 2621 titled "Bob" that is linked to node 2613 via a semantic relation 2619, such that "Sue," as represented by node 2613, "sells to" (e.g., the semantic relation 2619) "Bob" as represented by node 2621. Further, "Sue," as represented by node 2613 "is a manager of" node 2622 or "Kelly." Further, "Sue" represented by node 2613 "buys from" (e.g., the semantic relation 2625) node 2623 "Eli." Further, "Sue," as represented by node 2613, "is a manager of" "Ione," as represented by node 2618. Moreover, "Sue," as represented by node 2613 "reports to" "Joe," as represented by node 2614, where "reports to" is a semantic relation 2626. This semantic relation 2626 linking "Sue" and "Joe" also serves as a bridge link as is known in graph theory. Still further, "Joe" as represented by node 2614 "sells to" "Ito" as represented by node 2629. Joe is also a manager of "Franz" as represented by node 2616, and "Joe" "sells to" "Peter," as represented by node 2617. In some embodiments, this semantic map may be cyclic, whereas in other embodiments it may be acyclic in nature. Still further in some embodiments, the notions of whether the map is acyclic or cyclic in nature is not relevant insofar as additional links may exist between the nodes, in addition to the semantic relations, such that a traversal can occur from any node in the semantic map to any other node of any other semantic map.

Figure 27:
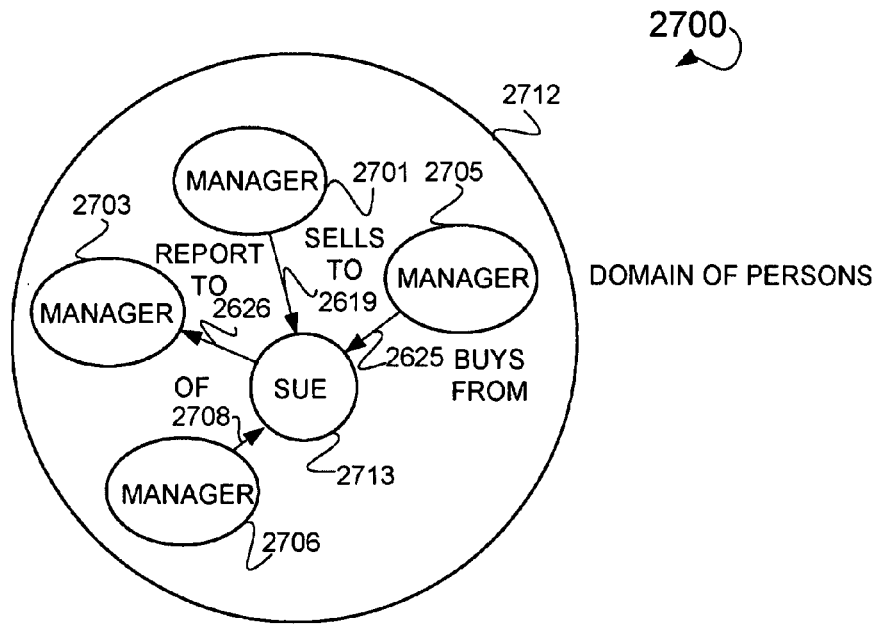
FIG. 27 is a diagram of a semantic map illustrating a domain of persons that includes managers, according to an example embodiment.

FIG. 27 is a diagram of an example semantic map 2700 illustrating a domain of persons 2712 that includes managers. This semantic map 2700 is illustrative of inter-domain relations or relationships between previous search terms (e.g., a first and second search term). Illustrated are manager nodes 2701, 2703, 2705, and 2706. In certain cases, these manager nodes are related to a node 2713 via various semantic relations, including semantic relation 2619 ("sells to"), semantic relation 2626 ("reports to"), semantic relation 2625 ("buys from"), and semantic relation 2708 ("of"). These semantic relations relate to node 2713 "Sue," and illustrate a semantic query in the form of "Manager sells to Sue," "Manager buys from Sue," "Manager of Sue," and "Sue reports to manager."

Figure 28:
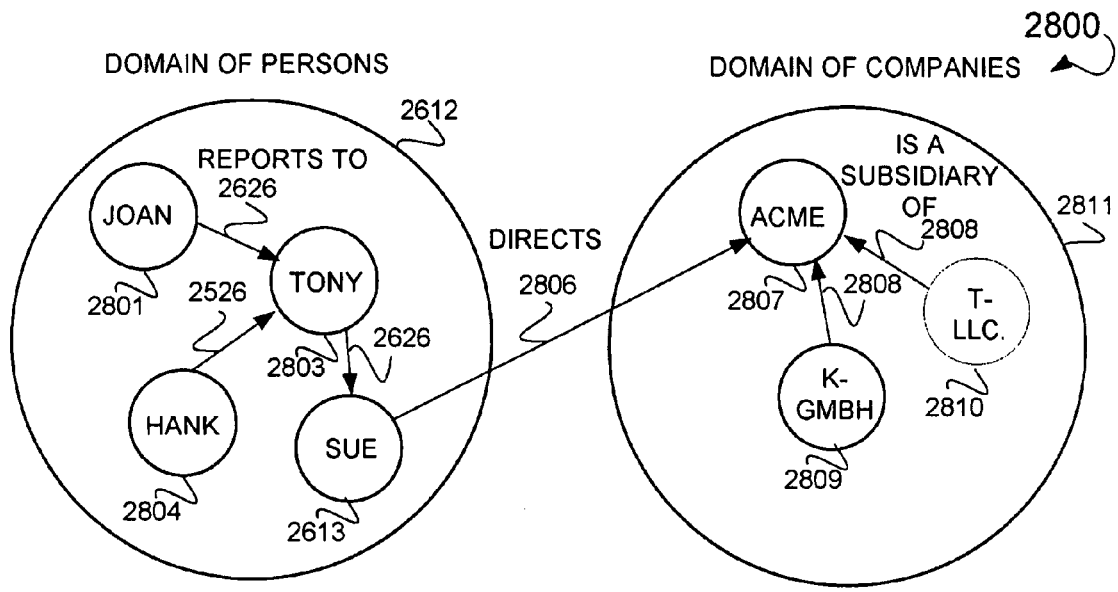
FIG. 28 is a diagram of a semantic map illustrating the mapping between members of two domains, according to an example embodiment.

FIG. 28 is a diagram of an example semantic map 2800 illustrating the mapping between members of two domains. This semantic map 2800 is illustrative of intra-domain relations or relationships between previous search terms (e.g., a first and second search term). Illustrated are a domain of persons 2612 and a domain of companies 2811. Contained within the domain of persons 2612 are a number of nodes illustrating certain persons, including a node 2801 "Joan," a node 2803 "Tony," and a node 2804 "Hank". "Joan" and "Hank" "report to" "Tony" as reflected by semantic relation 2626. Further, node 2803 "Tony" "reports to" node 2613 "Sue." Connecting the domain of persons 2612 and the nodes residing therein (e.g., 2801, 2803, 2804, and 2613) is a semantic relation 2806 that relates "Sue" 2613 to node 2807 "Acme" as reflected in the statement "Sue directs Acme." The node 2807 "Acme" is, in turn, related to node 2809 "K-GMBH" and node 2810 "T-LLC" by the semantic relation 2808 "is a subsidiary of," such that "K-GMBH is a subsidiary of Acme" and "T-LLC is a subsidiary of Acme."

Example Logic for Semantic Mapping

Figure 29:
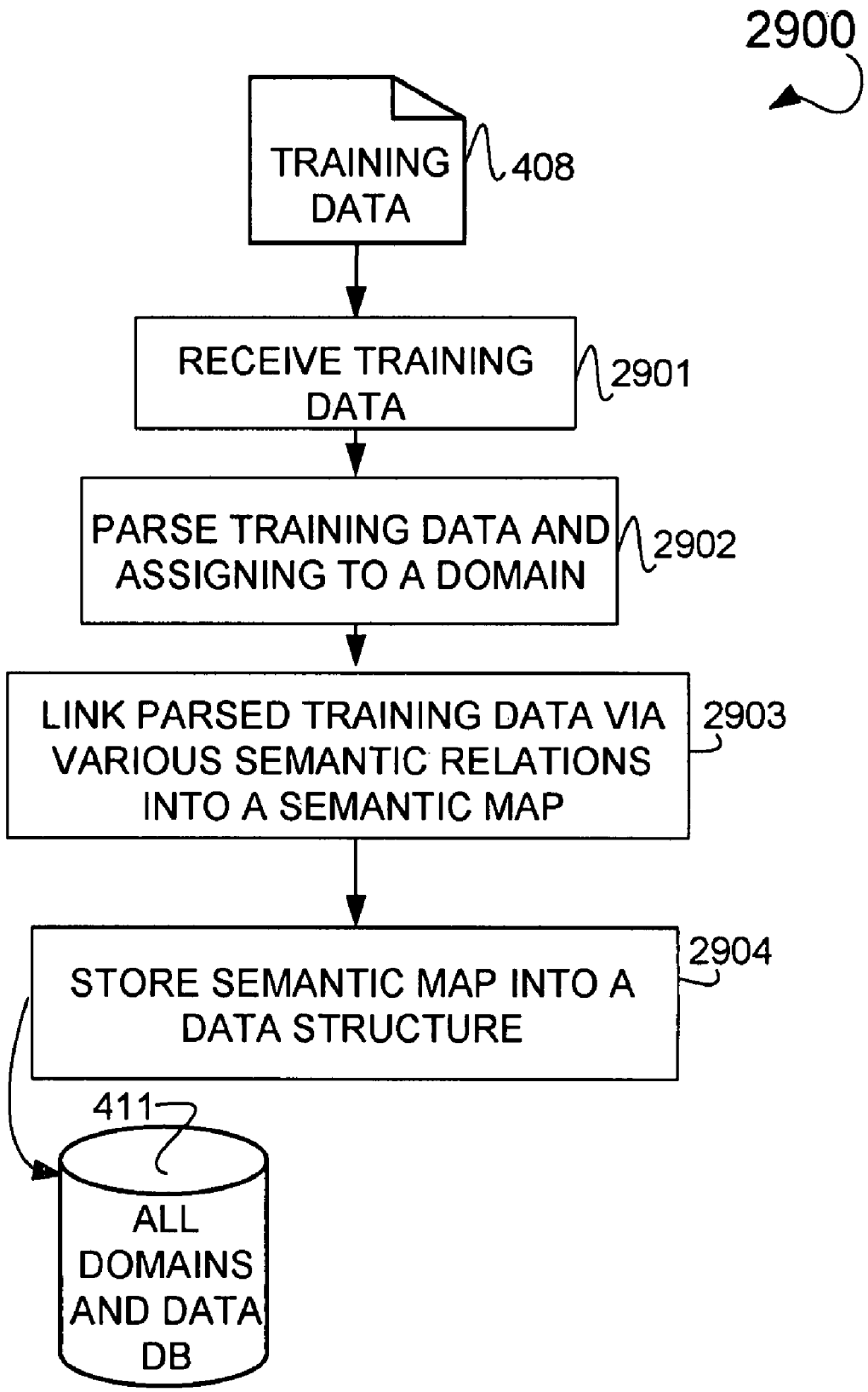
FIG. 29 is a flowchart illustrating a method used to implement the assignment engine to generate a semantic map, according to an example embodiment.

FIG. 29 is a flowchart illustrating an example method used to implement the assignment engine 412 to generate a semantic map. Illustrated is a training data packet 408 received through the execution of an operation 2901. Once received, an operation 2902 is executed that parses this training data packet 408 and assigns the resulting data (e.g., a node) to a particular domain. Then an operation 2903 is executed that links the parsed training data via various semantic relations such that once linked, a semantic map is generated (e.g., a map residing within one or more of the domains such as domain of persons 2612). Next, an operation 2904 is executed that stores the semantic map into some type of data structure, where this data structure may reside on the previously illustrated all domains and data database 411.

Figure 30:
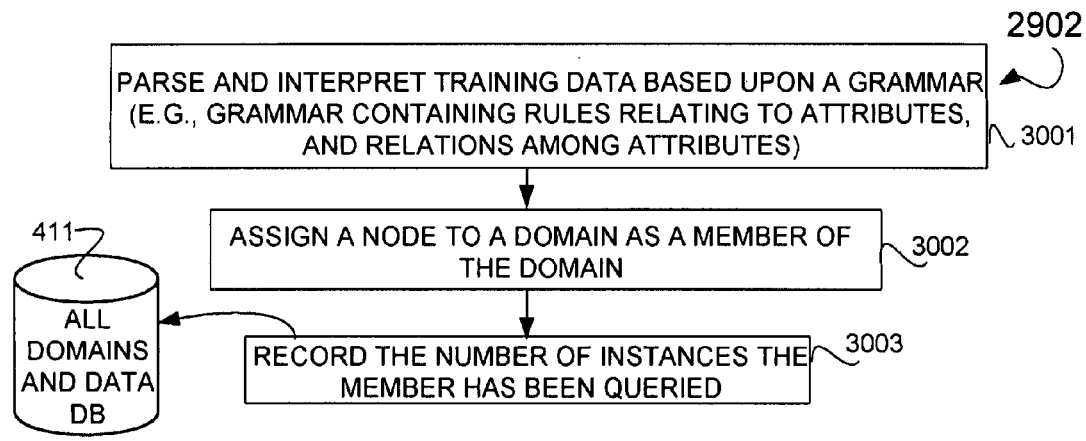
FIG. 30 is a flowchart illustrating an example method used to execute an operation that parses this training data packet and assigns the resulting data (e.g., a node) to a particular domain, according to an example embodiment.

FIG. 30 is a flowchart illustrating an example method used to execute operation 2902. Illustrated is an operation 3001 where training data such as a training data packet 408 is parsed and interpreted based upon some grammar. Next, an operation 3002 is executed that assigns a node derived from the training data to a domain as a member of a domain. Further, an operation 3003 is executed that records the number of instances this node has been recorded into the all domains and data database 411. The results of this operation 3003 may be used to determine the popularity of certain terms across domains.

Figure 31:
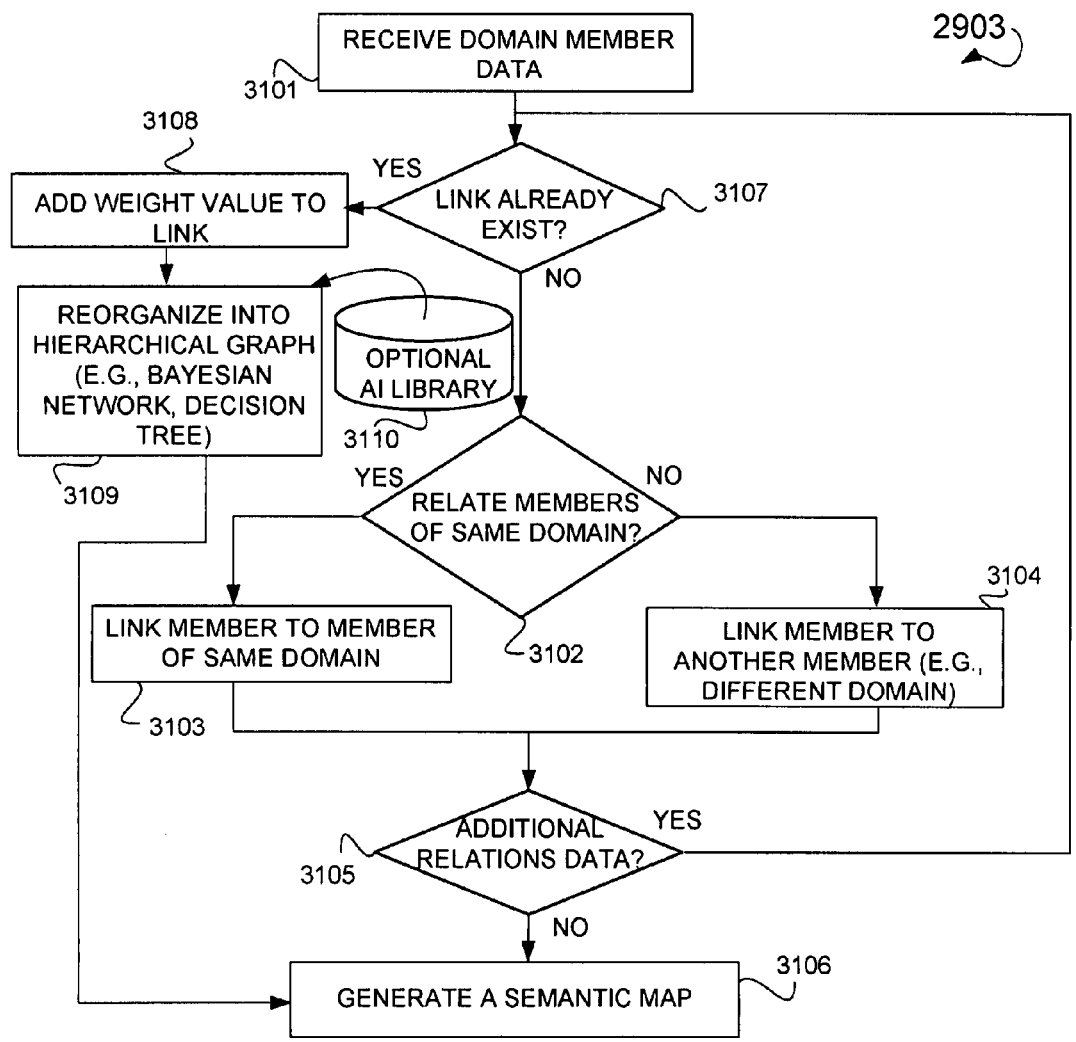
FIG. 31 is a flowchart illustrating a method used to implement an operation that links the parsed training data via various semantic relations such that once linked, a semantic map is generated, according to an example embodiment.

FIG. 31 is a flowchart illustrating an example method used to implement operation 2903. Illustrated is an operation 3101 that receives domain member data in the form of parsed training data. Once the data is received, a decisional operation 3107 is executed that determines whether a link already exists. In cases where decisional operation 3107 evaluates to "yes" (i.e., true), an operation 3108 is executed that adds a value to a link (e.g., a weighted value) to a semantic relation (e.g., 2615, or 2626). Next, an operation 3109 is executed that organizes or re-organizes the term in the domain (e.g., node data) into a graph such as a decision tree, bayesian network, or other type of graph that allows for the traversal of the graph based upon weighted values associated with the semantic relations. Various instructions for generating the graph may be contained in an optional AI library 3110. Once operation 3109 is executed, an operation 3106 may be executed as will be more fully illustrated below.

In cases where decisional operation 3107 evaluates to "no" (e.g., false) a decisional operation 3102 is executed, wherein a determination is made as to whether the training data are members of the same domain. In cases where decisional operation 3102 evaluates to "yes" (i.e., true), an operation 3103 is executed that links members of the same domain. In cases where decisional operation 3102 evaluates to "no", that is, false, an operation 3104 is executed that links a member of the domain to another member of a different domain. A further result of the execution of operation 3101 and the execution of operations 3103 and/or 3104, is a decisional operation 3105 that determines whether or not additional relations data exists. In cases where decisional operation 3105 evaluates to "yes" (i.e., true), decisional operation 3107 is re-executed. In cases where decisional operation 3105 evaluates to "no", that is, false, an operation 3106 is executed that generates and transmits a semantic map, such as the semantic map contained in the domain of persons 2812.

Some embodiments may include the AI library 3110 having any one of a number of AI algorithms at its disposal to be used to determine a search result set. The AI algorithms contained in this AI library 3110 may be thought of as falling into one of two categories of AI algorithms: deterministic or stochastic. One distinguishing feature of stochastic algorithms, as compared to deterministic algorithms, is that the former may use some sort of nondeterministic feature such as random number generation or random node selection (see, e.g., genetic algorithms) in its optimization analysis, while the latter avoids such random, non-deterministic features. This random number generation may allow for the avoidance of pitfalls such as slavish adherence to predictability criteria during the optimization process. Some embodiments may include the use of deterministic or stochastic algorithms in combination (see e.g., genetic fuzzy algorithms).

Some example embodiments may include any number of deterministic algorithms stored in the AI library 3110 and implemented by operation 3109 including case-based reasoning, bayesian networks (including hidden markov models), neural networks, or fuzzy systems. The bayesian networks may include: machine learning algorithms including-supervised learning, unsupervised learning, semi-supervised learning, reinforcement learning, transduction, learning to learn algorithms, or some other suitable bayesian network. The Neural Networks may include: kohonen self-organizing network, recurrent networks, simple recurrent networks, hopfield networks, stochastic neural networks, boltzmann machines, modular neural networks, committee of machines, Associative Neural Network (ASNN), holographic associative memory, instantaneously trained networks, spiking neural networks, dynamic neural networks, cascading neural networks, neuro-fuzzy networks, or some other suitable neural network.

In addition to deterministic algorithms such as a fuzzy neural network, any number of stochastic algorithms may be implemented including: genetic algorithms, ant algorithms, t algorithms, or monte carlo algorithms (e.g., Simulated Annealing). Common to these algorithms is the use of randomness (e.g., randomly generated numbers) to avoid the problem of being unduly wedded to a local minima or maxima.

In some embodiments, an AI algorithm or AI rule may be used (e.g., to propose an appropriate relation between two assigned terms, terms which have been assigned to domains) by taking into account whether the relation can be inferred on the basis of data suggesting this relation (e.g., by containing values which can be used for this purpose), or, more implicitly, where the relation can be inferred on the basis of the attributes which can be identified with the domains to which terms have been assigned.

Figure 32:
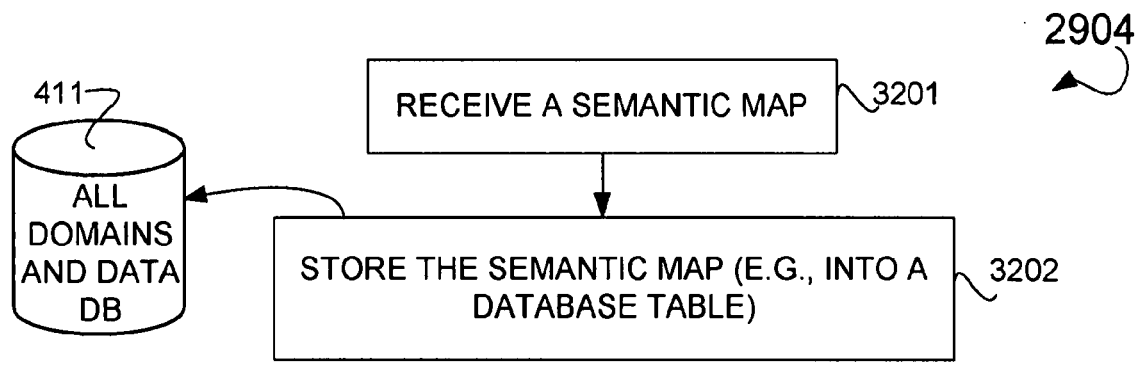
FIG. 32 is a flowchart illustrating a method used to execute an operation that stores the semantic map into some type of data structure, where this data structure may reside on a domain database, according to an example embodiment.

FIG. 32 is a flowchart illustrating an example method used to execute operation 2904. Illustrated is an operation 3201 that receives a semantic map, such as a semantic map contained in the domain of persons 2812, or even, in some cases, a sub-map. Once the semantic map has been received, an operation 3202 is executed that stores the semantic map into some type of data structure such as a matrix, multi-dimensional array, tree, hash table, heap, or some other suitable data structure. This data structure may reside as part of the all domains and data database 411. In some embodiments, semantic maps are generated on the basis of existing databases and database structures.

Example Block Diagrams

Figure 33:
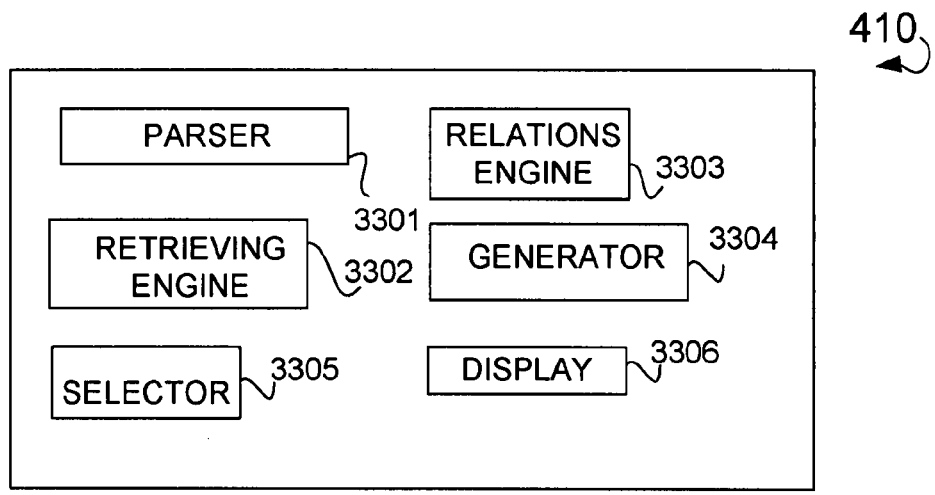
FIG. 33 is a block diagram of an application, according to an example embodiment.

FIG. 33 is a block diagram of an example application server 410. Illustrated are a number of blocks (e.g., modules) that can be implemented in hardware, firmware, or even software. Illustrated is a parser 3301 to parse a search query into one or more constituent terms, a retrieving engine 3302 to retrieve a member of a domain based upon the correspondence between the one or more constituent terms and the member of the domain, the member of the domain being an attribute in a database table, a relation engine 3303 to relate the member of the domain to a semantic phrase, the semantic phrase representing a semantic relationship between the member of the domain and another term, and a generator 3304 to generate a semantic query using the semantic phrase and the member of the domain. Additionally, illustrated is a selector 3305 to select a semantic phrase using a default relation, a probability value, or an AI algorithm. Moreover, the generator 3304 may be used to generate alternate semantic queries, the alternate semantic queries including the member of the domain and a different semantic phrase. Additionally, the semantic query may be an NL statement. The server 410 may also have a display 3306 to display the semantic query.

Figure 34:
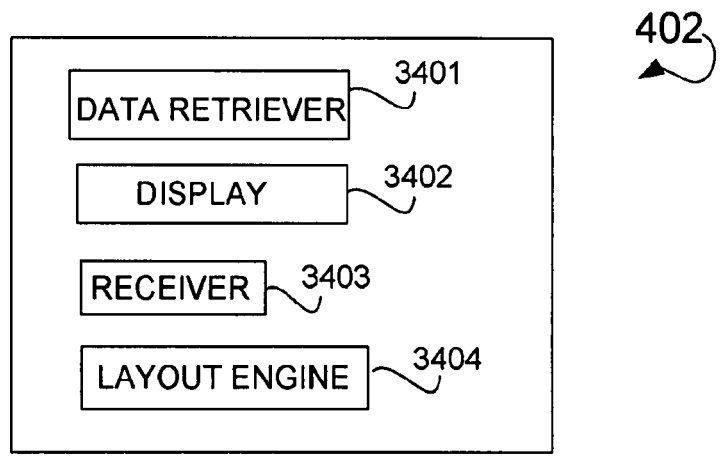
FIG. 34 is a block diagram of a device, according to an example embodiment.

FIG. 34 is a block diagram of an example device 402. Shown are various blocks (e.g., modules) that may be implemented in hardware, firmware, or even software. Illustrated is a data retriever 3401 to retrieve data to be displayed in a pane, the data comprising at least one of a semantic query data, or search result data; a display 3402 to display the semantic query data, or search result data, in the pane, a receiver 3403 to receive a selection input signal indicative of the selection device identifying a selected position within the pane; and a layout engine 3404 to present at least one of the semantic query data, or search result data. In some embodiments, the display 3402 may also display a search query in an input area, a label relating to a domain as a domain label, a semantic query in a best hits header area, search result data in a best hits area, semantic query data in a relations area, search results in an additional results area, and search results in a related actions area.

Example Data Table for Searching

Some embodiments may include the various databases (e.g., 411) being relational databases, or, in some cases, OLAP-based databases. In the case of relational databases, various tables of data are created and data is inserted into, and/or selected from, these tables using SQL or some other database-query language known in the art. In the case of OLAP databases, one or more multi-dimensional cubes or hyper cubes containing multidimensional data from which data is selected from or inserted into using a MDX may be implemented. In the case of a database using tables and SQL, a database application such as, for example, MYSQL™, SQLSERVER™, Oracle 81™, or 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. These tables or cubes made up of tables, in the case of, for example, ROLAP, are organized into a RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization, and optimization algorithm known in the art.

Figure 35:
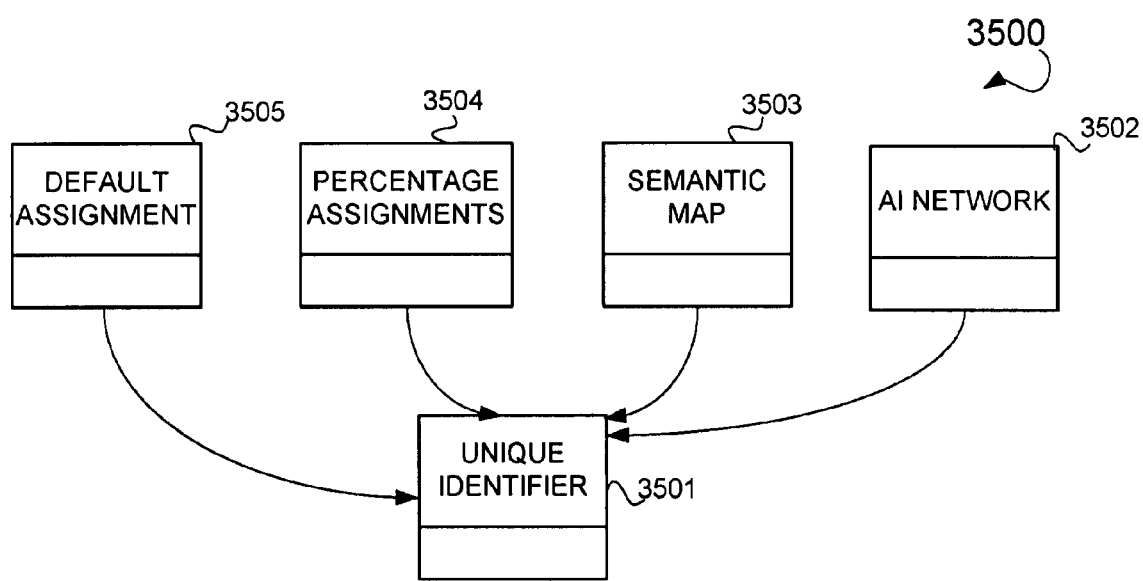
FIG. 35 is a Relational Data Schema (RDS) illustrating various tables of data that may reside on a domain database, according to an example embodiment.

FIG. 35 is a Relational Database Schema (RDS) 3500 illustrating various tables of data that may reside on, for example, an all domains and data database 411. Illustrated is a table 3505 containing default assignment data. This default assignment data may relate to a default domain into which data from a training data packet 408 may be placed. This training data may be of a string or other suitable data type. Further, a table 3504 containing percentage assignments is also illustrated. Table 3504 may contain data that is of a float, double or other suitable data type capable of processing percentage values. A table 3503 is illustrated that contains a semantic map. Table 3503 may contain data in the form of a Binary Large Object (BLOB) or other suitable data type capable of processing a semantic map. Next, a table 3502 is shown that contains various AI algorithms and/or a network reflecting the implementation of one or more of these AI algorithms. This network may be a decision tree, bayesian network or other suitable AI derived network diagram. A BLOB may be used to store this AI algorithm and/or network. A unique identifier table 3501 may contain constraint values to uniquely identify the entries in each of the tables 3502-3505.

Component Design

Some example embodiments may include the above-illustrated modules and operations being written as one or more software components. Common to many of these components is the ability to generate, use, and manipulate the above-illustrated UI elements and layout elements and the data associated therewith. These components, and the functionality associated with each, may be used by client, server, or peer computer systems. These various components can be implemented into the system on an as-needed basis. These components may be written in an object-oriented computer language such that a component oriented or object-oriented programming technique can be implemented using a Visual Component Library (VCL), Component Library for Cross Platform (CLX), Java Beans (JB), Enterprise JavaBeans (EJB), Component Object Model (COM), or Distributed Component Object Model (DCOM) or other suitable technique. These components are linked to other components via various Application Programming Interfaces (APIs), Business Application Programming Interfaces (BAPIs) and then compiled into one complete server and/or client application. The method for using components in the building of client and server applications is well known in the art. Further, these components may be linked together via various distributed programming protocols as distributed computing components.

Distributed Computing Components and Protocols

Some example embodiments may include remote procedure calls being used to implement one or more of the above-illustrated components across a distributed programming environment. For example, a logic level may reside on a first computer system that is remotely located from a second computer system containing an interface level (e.g., a GUI). These first and second computer systems can be configured in a server-client, peer-to-peer, or some other configuration. These various levels can be written using the above-illustrated component design principles and can be written in the same programming language or a different programming language. Various protocols may be implemented to enable these various levels, and components contained therein, to communicate regardless of the programming language used to write these components. For example, an operation written in C++ using the Common Object Request Broker Architecture (CORBA) or Simple Object Access Protocol (SOAP) can communicate with another remote module written in JAVA™. These protocols include SOAP and CORBA or some other suitable protocol. These protocols are well-known in the art.

Example Computer System

Figure 36:
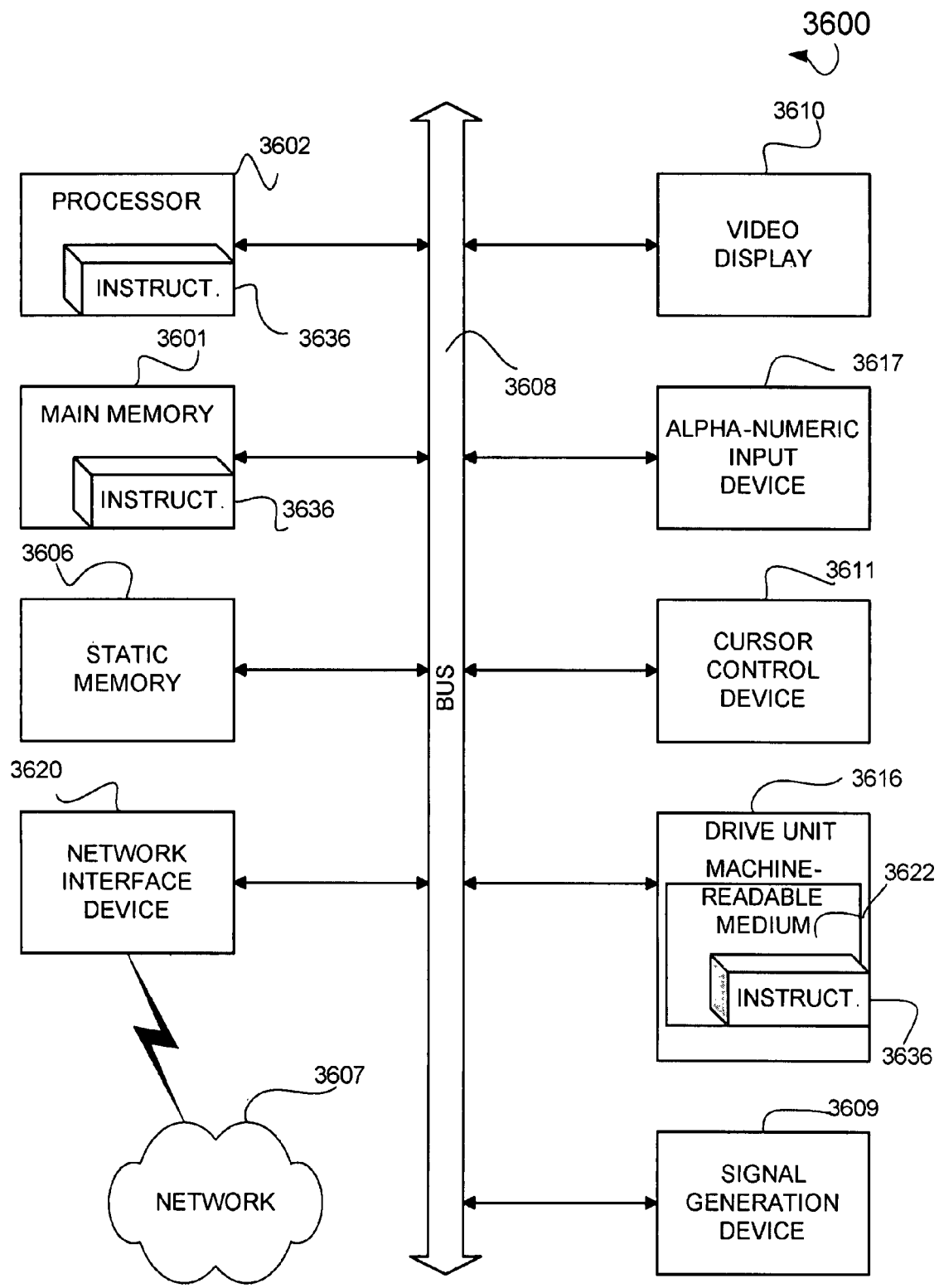
FIG. 36 shows a diagrammatic representation of a machine in the form of a computer system that executes a set of instructions to perform any one or more of the methodologies discussed herein, according to an example embodiment.

FIG. 36 shows a diagrammatic representation of a machine in the example form of a computer system 3600 that executes a set of instructions to perform any one or more of the methodologies discussed herein. One of the devices 402 may be configured as a computer system 3600. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a PC, a tablet PC, a Set-Top Box (STB), a PDA, a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems, which are linked (e.g., either by hardwired, wireless, or a combination of hardwired and wireless connections) through a network, both perform tasks such as those illustrated in the above description.

The example computer system 3600 includes a processor 3602 (e.g., a Central Processing Unit (CPU), a Graphics Processing Unit (GPU) or both), a main memory 3601, and a static memory 3606, which communicate with each other via a bus 3608. The computer system 3600 may further include a video display unit 3610 (e.g., a Liquid Crystal Display (LCD) or a Cathode Ray Tube (CRT)). The computer system 3600 also includes an alpha-numeric input device 3617 (e.g., a keyboard), a user interface (UI) cursor controller 3611 (e.g., a mouse), a disk drive unit 3616, a signal generation device 3609 (e.g., a speaker) and a network interface device (e.g., a transmitter) 3620.

The disk drive unit 3616 includes a machine-readable medium 3622 on which is stored one or more sets of instructions and data structures (e.g., software) 3636 embodying or used by any one or more of the methodologies or functions illustrated herein. The software may also reside, completely or at least partially, within the main memory 3601 and/or within the processor 3602 during execution thereof by the computer system 3600. The main memory 3601 and the processor 3602 also constitute machine-readable media.

The instructions 3636 may further be transmitted or received over a network 3607 via the network interface device 3620 using any one of a number of well-known transfer protocols (e.g., Hyper Text Transfer Protocol (HTTP), Session Initiation Protocol (SIP)).

The term "machine-readable medium" should be taken to include a single medium or multiple media (e.g., a centralized or distributed database, and/or associated caches and servers) that stores the one or more sets of instructions. The term "machine-readable medium" shall also be taken to include any medium that is capable of storing, encoding, or carrying a set of instructions for execution by the machine and that causes the machine to perform any of the one or more of the methodologies illustrated herein. The term "machine-readable medium" shall accordingly be taken to include solid-state memories, optical media, and magnetic media.

Marketplace Applications

One exemplary advantage of an embodiment of the present method and system is to facilitate the tailoring of search results based upon user-controllable NL statements. These NL statement may be used as training data to populate a database containing such search results. This system and method may reside as part of an enterprise search application such as SAP ENTERPRISE SEARCH™, or some other suitable semantic search application. By allowing users (e.g., IT administrators) to generate training data, search results may be based upon common uses of a search query and corresponding search results, where common uses may be industry-defined. For example, where a user conducting a search uses the terms "manager Sue," the user may retrieve a search result not based upon text containing the literal text string (e.g., string based searching or "pattern matching") "manager Sue," but rather may retrieve search results relating to "manager who report to Sue," "managers who instruct Sue," or some other search results based upon training data supplied. As compared to string-based searching, this semantic searching can allow for more granular, unequivocal or refined searching to occur, such that typically ambiguous search terms can be uncovered.

In some embodiments, the search term "Manhattan", with manhattan being optionally in any one of a number of domains such as "drinks", "locations", or "ships", and the relation between them (e.g., in the case of "manhattan John", with optional relations being based on the respective assignment of these terms to domains: {Manhattan cocktails [drinks] sold by John [a person]; manhattan [location] where John [a person] was born; manhattan [ship] steered by captain John [a person]}) can be readily disambiguated based upon assigning terms to domains and identifying suitable relations as they can be inferred on the basis of commonly understood relations between the respective domains or sub-domains.

Further exemplary advantages exist in that users may be able to enter just a few (e.g., 1-2) search terms without the need to use any specific notations (e.g., SQL query expressions) or a specific query language. Further, a user may be able to progressively (e.g., emulating the principle of progressive disclosure) specify their search intent. Some embodiments may include allowing users to take advantage of system support both at the level of the UI (e.g., allowing users to actively express their search intent through using the UI), or at the system level where users are presented with system-initiated rephrases of the users' initial search queries, such that users do not have to reiterate new search queries every time a search is performed.

The Abstract of the Disclosure is provided to comply with 37 C.F.R. §1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   receiving a search query;
   parsing the search query to identify first and second search terms;
   assigning the first search term and the second search term to respective domains, each domain being a semantic category comprising a set of entities of similar type;
   determining a relationship between the first and second search terms based on their respective domain assignments;
   conducting a search based on the respective domain assignments;
   displaying a result of the search based on the respective domain assignments, the result of the search being displayed as a plurality of rephrasings of the search query, the plurality of rephrasings of the search query comprising alternative semantic queries, respective alternative semantic queries comprising the first term, the second term, and a semantic phrase indicating the relationship between the first and second search terms, the alternative semantic queries comprising different semantic phrases;
   receiving user input indicative of selection of a selected one of the plurality of rephrasings of the search query; and
   conducting a further search based on the selected rephrasing of the search query.

2. The method of claim 1, further comprising assigning the relationship between the first and second search terms to a data store as an inter-domain relationship.

3. The method of claim 1, further comprising assigning the relationship between the first and second search terms to a data store as an intra-domain relationship.

4. The method of claim 1, wherein the first and second search terms are assigned to the same domain.

5. The method of claim 1, wherein the first and second search terms are assigned to different domains.

6. The method of claim 1, wherein the relationship between the first and second search terms based on their respective domain assignments is at least one of a default relationship, a manually assigned relationship, or a probability-based relationship.

7. The method of claim 1, wherein at least one rephrasing of the search query comprises a Natural Language (NL) statement.

8. A machine-readable medium comprising instructions, which when implemented by one or more machines cause the one or more machines to perform the following operations:
   receiving a search query;
   parsing the search query to identify two or more search terms;
   assigning the first search term and the second search term to respective domains, each domain being a semantic category comprising a set of entities of similar type;
   determining a relationship between the two or more search terms based on their respective domain assignments;
   conducting a search based on the respective domain assignments; and
   displaying a result of the search based on the respective domain assignments, the result of the search being displayed as a plurality of rephrasings of the search query, the plurality of rephrasings of the search query comprising alternative semantic queries, respective alternative semantic queries comprising the first term, the second term, and a semantic phrase indicating the relationship between the first and second search terms, the alternative semantic queries comprising different semantic phrases;
   receiving user input indicative of selection of a selected one of the plurality of rephrasings of the search query; and
   conducting a further search based on the selected rephrasing of the search query.

9. A computer system comprising:
   a parser to parse a search query to identify first and second search terms;
   a relation engine to assign the first and second terms to respective domains, each domain being a semantic category comprising a set of entities of similar type, the relation engine further to determine a relationship between the first and second search terms based on respective domain assignments of the first and second search terms;
   a query engine to conduct a search based on the respective domain assignments, the query engine to generate a plurality of rephrasings of the search query, the plurality of rephrasings of the search query comprising alternative semantic queries, respective alternative semantic queries comprising the first term, the second term, and a semantic phrase indicating the relationship between the first and second search terms, the alternative semantic queries comprising different semantic phrases; and
   a display to display a result of the search based on the respective domain assignments, the result of the search to be displayed as the plurality of rephrasings of the search query,
   wherein the query engine is to conduct a further search in response to receiving user input indicative of selection of one of the plurality of rephrasings of the search query.

10. The computer system of claim 9, wherein the relation engine is to assign the relationship between the first and second search terms to a data store as an inter-domain relationship.

11. The computer system of claim 9, wherein the relation engine is to assign the relationship between the first and second search terms to a data store as an intra-domain relationship.

12. The computer system of claim 9, wherein the relation engine is to assign the first and second search terms to the same domain.

13. The computer system of claim 9, wherein the relation engine is to assign the first and second search terms to different domains.

14. The computer system of claim 9, wherein the relation engine is to determine the relationship between the first and second search terms based on their respective domain assignments as at least one of a default relationship, a manually assigned relationship, or a probability-based relationship.

15. The computer system of claim 9, wherein at least one rephrasing of the search query comprises a Natural Language (NL) statement.

* * * * *